US012544944B2

(12) United States Patent
Liberatore

(10) Patent No.: US 12,544,944 B2
(45) Date of Patent: Feb. 10, 2026

(54) DUAL SIDED RAZOR

(71) Applicant: Mack-Ray Inc., Bentonville, AR (US)

(72) Inventor: Raymond A. Liberatore, Bentonville, AR (US)

(73) Assignee: Mack-Ray Inc., Bentonville, AR (US)

( * ) Notice: Subject to any disclaimer, the term of this patent is extended or adjusted under 35 U.S.C. 154(b) by 615 days.

(21) Appl. No.: 17/831,021

(22) Filed: Jun. 2, 2022

(65) Prior Publication Data

US 2023/0390952 A1 Dec. 7, 2023

Related U.S. Application Data

(63) Continuation of application No. PCT/US2020/062824, filed on Dec. 2, 2020.

(60) Provisional application No. 62/943,438, filed on Dec. 4, 2019.

(51) Int. Cl.
*B26B 21/22* (2006.01)
*B26B 21/52* (2006.01)

(52) U.S. Cl.
CPC .......... *B26B 21/222* (2013.01); *B26B 21/521* (2013.01)

(58) Field of Classification Search
CPC ............................ B26B 21/222; B26B 21/521
See application file for complete search history.

(56) References Cited

U.S. PATENT DOCUMENTS 4,475,286 A 10/1984 Saito
5,787,586 A * 8/1998 Apprille, Jr. .......... B26B 21/225 30/47
5,813,293 A 9/1998 Apprille, Jr. et al.
6,164,290 A 12/2000 Andrews
8,745,876 B2 * 6/2014 Hage ....................... B26B 21/44 30/527
10,850,412 B2 * 12/2020 Harris, II .............. B26B 21/522
12,240,135 B2 * 3/2025 Bourque ............... B26B 21/225

(Continued)

FOREIGN PATENT DOCUMENTS

EP 1 990 142 A1 11/2008
RU 108335 U1 9/2011

(Continued)

OTHER PUBLICATIONS

International Search Report with Written Opinion issued for International Application No. PCT/US2020/062824 mailed on Feb. 25, 2021.

(Continued)

*Primary Examiner* — Omar Flores Sanchez
(74) *Attorney, Agent, or Firm* — Myers Wolin, LLC

(57) ABSTRACT

A dual sided disposable razor and system razor is provided having arms supporting a cartridge. The dual sided disposable razor and system razor comprise a handle extending vertically with a first side and a second side. The second side has a profile symmetric to the first side. The dual sided razor also has a first pivot extending horizontally from a first arm and a second pivot extending horizontally from a second arm, and the cartridge is configured to be rotated about the first pivot and the second pivot to switch between a first side of the cartridge or a second side of the cartridge to bias the cartridge to either the first side or to the second side. This facilitates user to switch between sides without having to detach the cartridge.

9 Claims, 33 Drawing Sheets

(56) References Cited

U.S. PATENT DOCUMENTS

| | | | | |
|---|---|---|---|---|
| 2008/0216329 | A1* | 9/2008 | Leventhal | B26B 21/222 30/526 |
| 2012/0151775 | A1* | 6/2012 | Ren | B26B 21/227 30/50 |
| 2014/0000114 | A1* | 1/2014 | Wester | B26B 21/28 30/32 |
| 2017/0021513 | A1* | 1/2017 | Liberatore | B26B 21/225 |
| 2017/0326741 | A1* | 11/2017 | Liberatore | B26B 21/565 |
| 2017/0326744 | A1* | 11/2017 | Liberatore | B26B 21/4012 |
| 2018/0141225 | A1 | 5/2018 | Zucker | |
| 2018/0326606 | A1* | 11/2018 | Liberatore | B26B 21/521 |
| 2019/0270211 | A1* | 9/2019 | Harris, II | B26B 21/521 |
| 2020/0171685 | A1* | 6/2020 | Liu | B26B 21/4018 |
| 2021/0170615 | A1* | 6/2021 | Son | B26B 21/4031 |
| 2022/0258365 | A1* | 8/2022 | Hashimoto | B26B 21/222 |
| 2022/0314475 | A1* | 10/2022 | Hashimoto | B26B 21/227 |
| 2024/0157590 | A1* | 5/2024 | Hitchcock | B26B 21/4025 |
| 2024/0246713 | A1* | 7/2024 | Post | B65D 77/2024 |
| 2024/0424701 | A1* | 12/2024 | Park | B26B 21/18 |
| 2025/0050520 | A1* | 2/2025 | Loughlin | B26B 21/4018 |

FOREIGN PATENT DOCUMENTS

| | | | |
|---|---|---|---|
| WO | 2010/078564 | A2 | 7/2010 |
| WO | 2012172381 | A1 | 12/2012 |
| WO | 2015/134700 | A1 | 9/2015 |

OTHER PUBLICATIONS

Search report issued by the Israeli Patent Office for IL Patent Application No. 293539, dated Sep. 8, 2024.

Notice of Deficiencies issued by the Israeli Patent Office for Israeli Patent Application No. 293539, dated Sep. 8, 2024.

Search Report issued by the Russian Patent Office for Russian Patent Application No. 2022117990, dated Dec. 8, 2023.

* cited by examiner

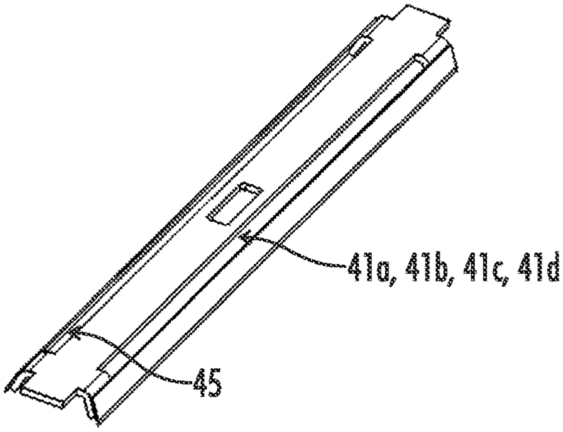
FIG. 46
FIG. 47
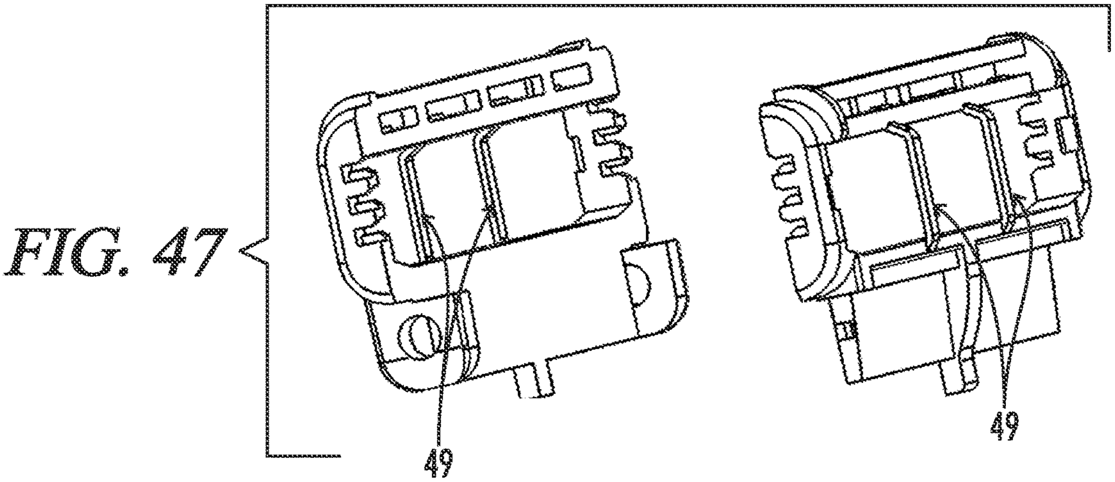
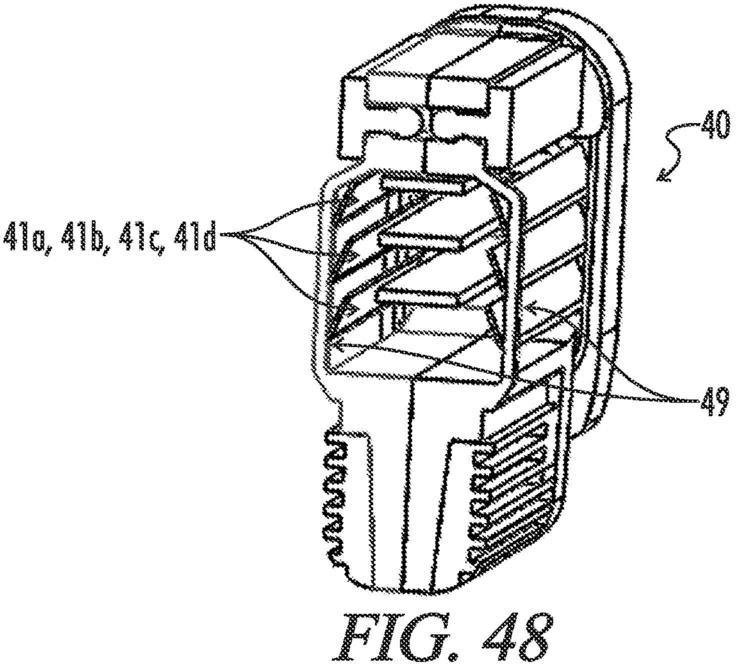
FIG. 48

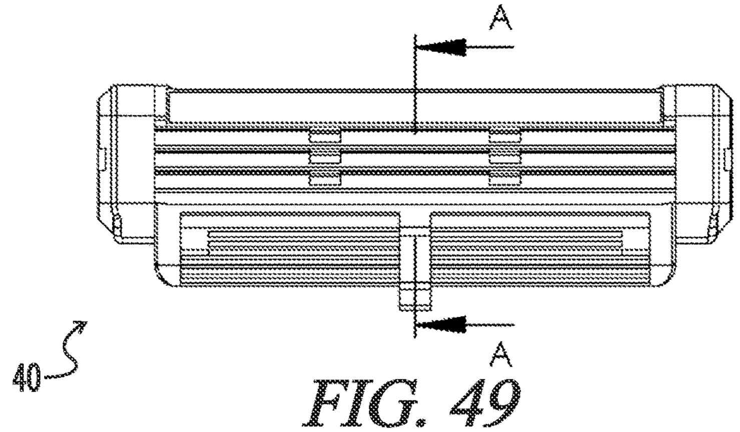
FIG. 49
FIG. 50
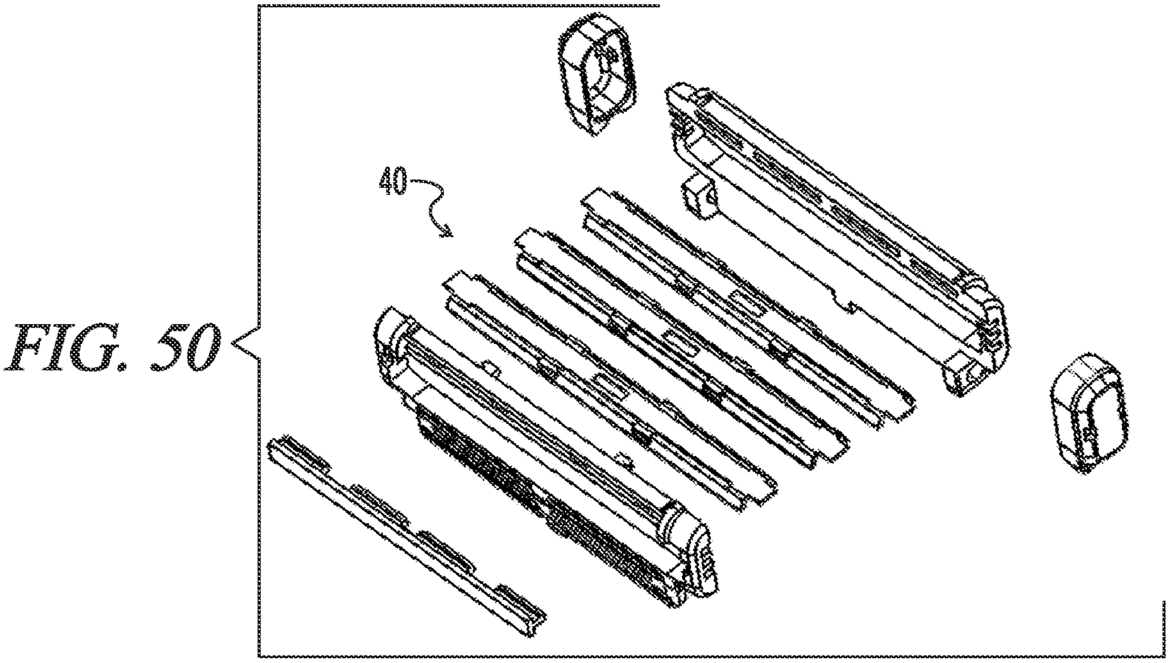
FIG. 51
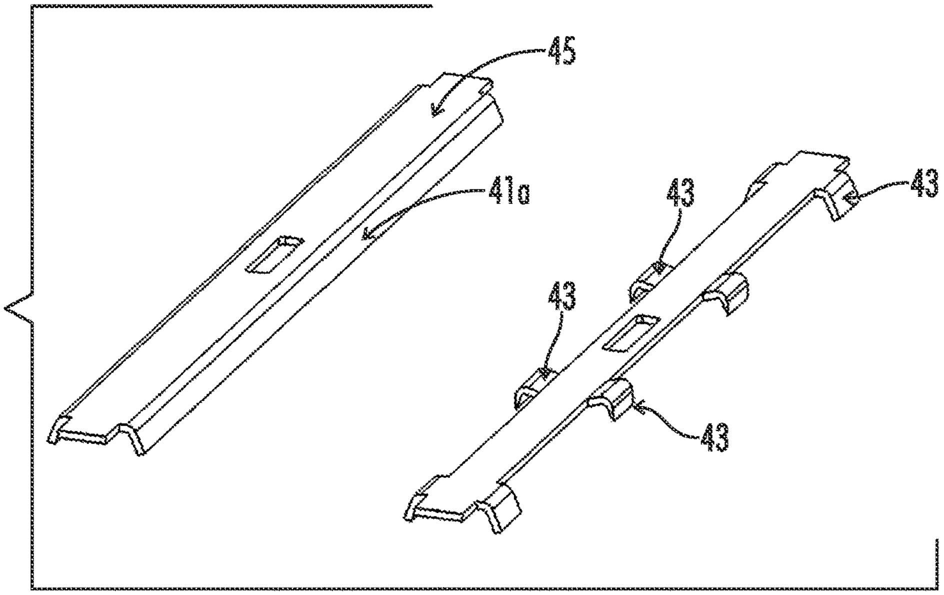

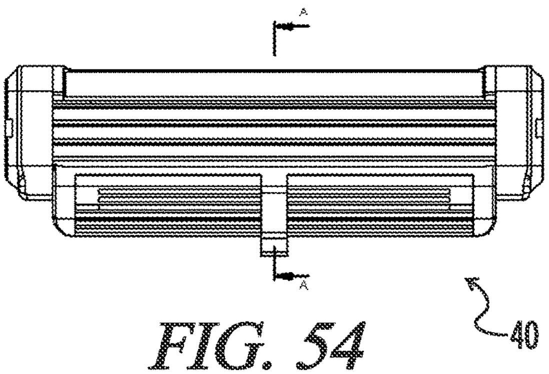
FIG. 54
FIG. 55
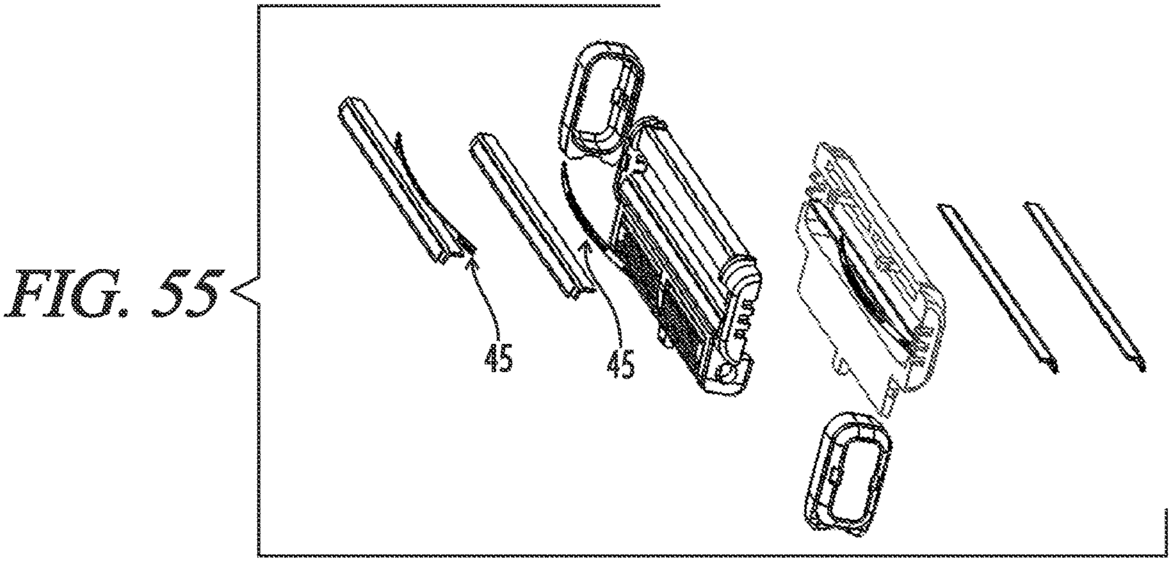
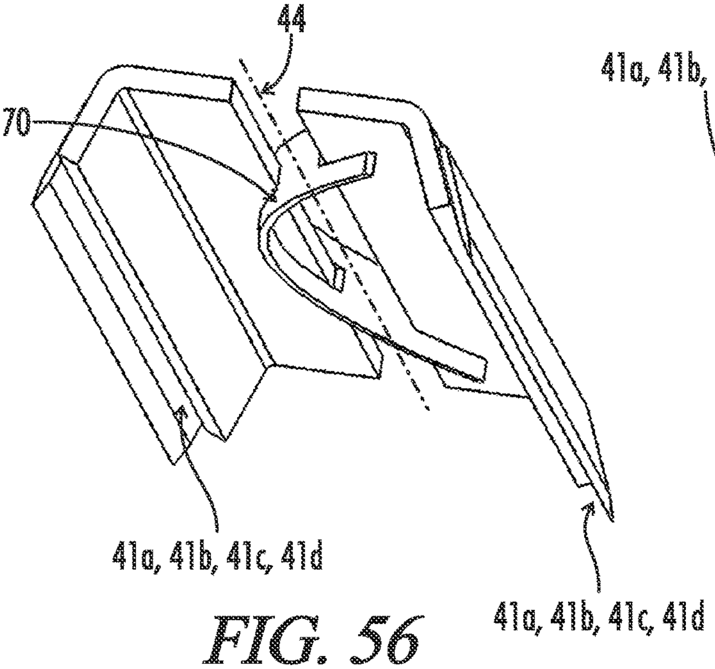
FIG. 56
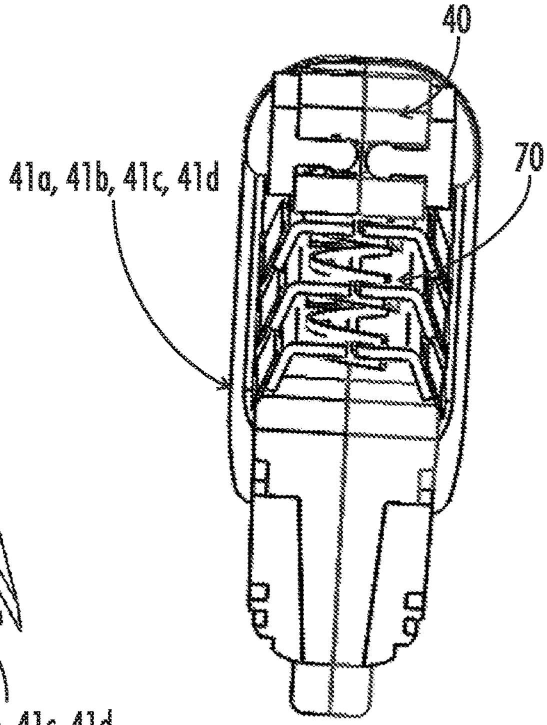
FIG. 57

DUAL SIDED RAZOR

CROSS REFERENCE TO RELATED APPLICATIONS

This application is a continuation of International Application No. PCT/US2020/062824, filed Dec. 2, 2020, which claims the benefit of U.S. Provisional Application No. 62/943,438, filed Dec. 4, 2019, the contents of which are incorporated by reference herein.

FIELD OF THE INVENTION

The present disclosure relates to razors and more particularly to a dual sided razor.

BACKGROUND

The background information herein below relates to the present disclosure but is not necessarily prior art.

Dual sided razors incorporate switching of blade sides either by having a user to detach the cartridge from the handle, and or by rotating the cartridge about a vertical axis passing through the center of the handle. This poses the user with hassles in switching from the 1st side of the cartridge to the 2nd side of the cartridge and requiring a lot of time. Further, the blades are not flexible and hence do not comply or adjust to the user's different skin surfaces and contours, thus compromising shaving performance. Still further, the design of the handles of such razors do not have symmetric profiles on the sides making it difficult to grasp and shave on both sides of the handle when the user shaves with the 1st side of the cartridge and when the user shaves with the 2nd side of the cartridge.

There is, therefore, felt a need of a dual sided razor which overcomes the aforementioned problems.

SUMMARY

Some of the objects of the present disclosure, which at least one embodiment herein satisfies, are as follows:

An object of the present disclosure is to provide a dual sided razor.

Another object of the present disclosure is to provide a dual sided razor that offers shaving comfort while switching sides of the blades.

Still another object of the present disclosure is to provide a dual sided razor that prevents inadvertent switching of blade sides.

Yet another object of the present disclosure is to provide a dual sided razor that is cost affordable to end users.

Other objects and advantages of the present disclosure will be more apparent from the following description, which is not intended to limit the scope of the present disclosure.

The present disclosure relates to a dual sided razor having arms supporting a cartridge. The dual sided razor comprises a handle extending vertically with a first side and a second side. The second side has a profile symmetric to the first side. The dual sided razor further comprises a first pivot extending horizontally from a first Arm and a second pivot extending horizontally from a second arm. The cartridge is configured to be rotated about the first pivot and the second pivot to switch between a first side of the cartridge or a second side of the cartridge to bias the cartridge to either the first side or to the second side.

In an embodiment, end caps are attached on the ends of the cartridge, each of the end caps having a first groove and a second groove.

In another embodiment, the blades configured on the cartridge blade carrier flexes and move over different contours of the user's skin made of a resiliently deformable material.

In a preferred embodiment, prongs having a toothed profile are attached to each of the first arm and the second arm and the prong attachment area on the cartridge has a toothed profile.

In another embodiment, a deflector protrudes from a bottom portion of the cartridge having a smooth rounded profile or any shape or size.

In yet another embodiment, a barrier is removable attached to the top portion of the handle and is permanent or disposable razor models and which is made of resiliently deformable material and is stiff and made of any type of material.

In yet another embodiment, cushions, are provided on an operative end of each of the first arm and the second arm.

The dual sided razor wherein the blades are configured with resiliently deformable elements from the group consisting of blade fingers, leaf spring.

The dual sided razor wherein the blades are made of a resiliently deformable material.

The dual sided razor includes constraining elements are configured on the cartridge to prevent deflection of blades away from the cartridge outer surfaces while allowing deflection towards the central region of the cartridge, the constraining elements selected from the group consisting of cartridge ribs, blade tabs and metal channel.

The dual sided razor having the cartridge is configured with resiliently deformable elements from the group consisting of blade fingers, leaf spring.

The dual sided razor having the cartridge is configured to be constructed as a two-piece cartridge, the cartridge (40) being configured to be detachably attached along the blade pivot axis.

The dual sided razor has the blade fingers (47) configured to extend from the cartridge (40).

BRIEF DESCRIPTION OF THE DRAWINGS

The dual sided razor of the present disclosure will now be described with the help of the accompanying drawing, in which:

FIG. 46 shows a blade carrier with and a blade welded to a blade carrier that goes into the two-sided floating blade—flexible blade cartridge shown in FIGS. 41 and 42

FIG. 47 shows the 2 halves of two-sided floating blade—flexible blade cartridge shown in FIGS. 41 and 42 with cartridge ribs on each face of the cartridge.

FIG. 48 show a detailed side cross section view of a two-sided floating blade—flexible blade cartridge with cartridge ribs covering the blades shown in FIGS. 40 and 41.

FIGS. 49 and 50 shows another version of two-sided floating blade-flexible blade cartridge.

FIG. 51 shows a current blade welded to a blade carrier and a blade welded to a blade carrier that goes into the two-sided floating blade—flexible blade cartridge shown in FIGS. 49 and 50.

FIG. 54 shows another version of two-sided floating blade—flexible blade cartridge.

FIG. 55 shows an exploded view of a two sided floating blade—flexible blade cartridge with flexible/leaf springs that are connected to each side of the blade & blade carrier.

FIG. 56 shows a flexible/leaf springs that are connected to each side of the blade & blade carrier.

FIG. 57 show a detailed side cross section view of a two-sided floating blade—flexible blade cartridge as shown in FIGS. 54 and 55

FIG. 62 shows another version of a blade welded to a blade carrier.

FIG. 63 shows the backside view of a blade welded to a blade carrier as shown in FIG. 63.

FIG. 64 shows a detailed side cross section view of a two-sided floating blade—flexible blade cartridge as shown in FIG. 65.

FIG. 65 shows one side of a two-sided floating blade—flexible blade cartridge.

FIG. 66 shows a two-sided floating blade—flexible blade cartridge a blade attached to a blade carrier with the metal channel 80 attached.

FIG. 67 shows an enhanced view on an end of a blade attached to a blade carrier with the metal channel 80 attached.

FIG. 68 shows a top section view of the cartridge shown in FIG. 65

DETAILED DESCRIPTION OF THE PREFERRED EMBODIMENTS

Figure 1:
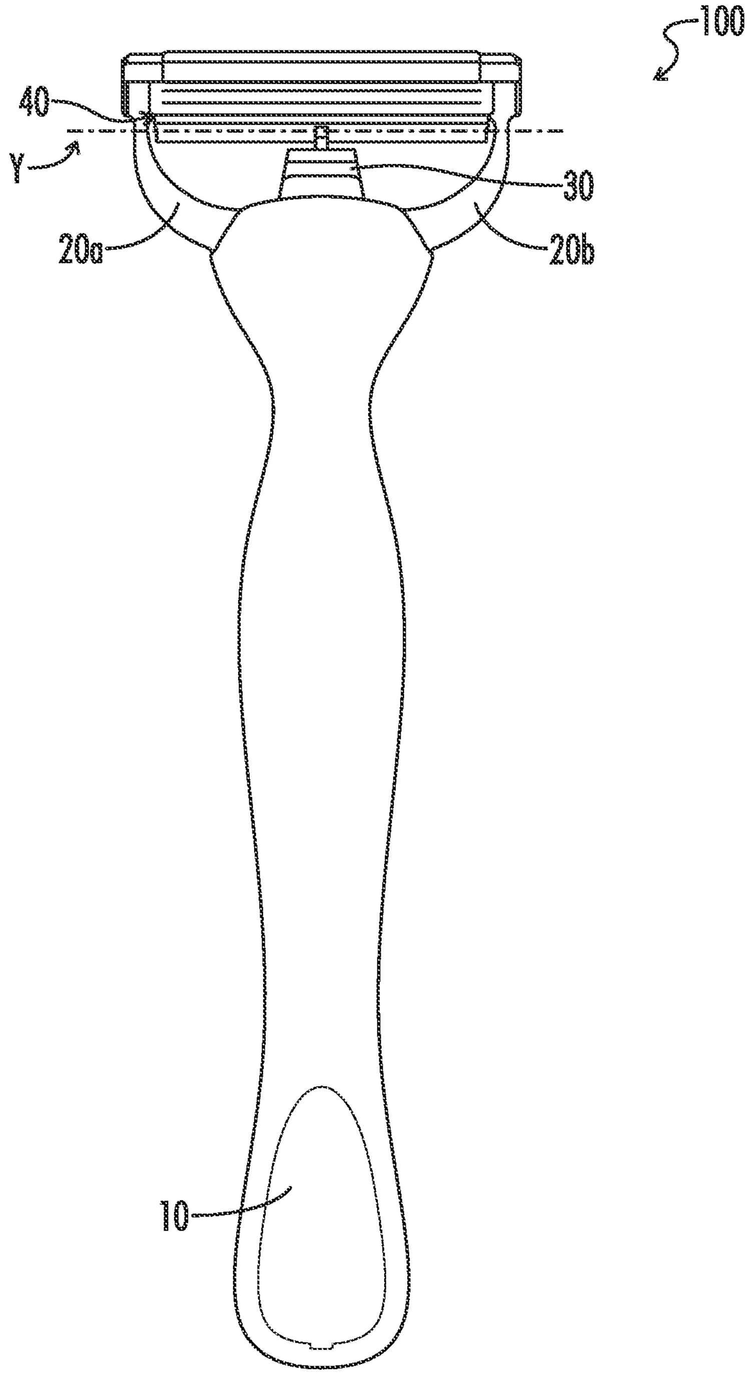
FIG. 1 shows a front view of a dual sided disposable razor with a broad type barrier, in accordance with an embodiment of the present disclosure.
Figure 2:
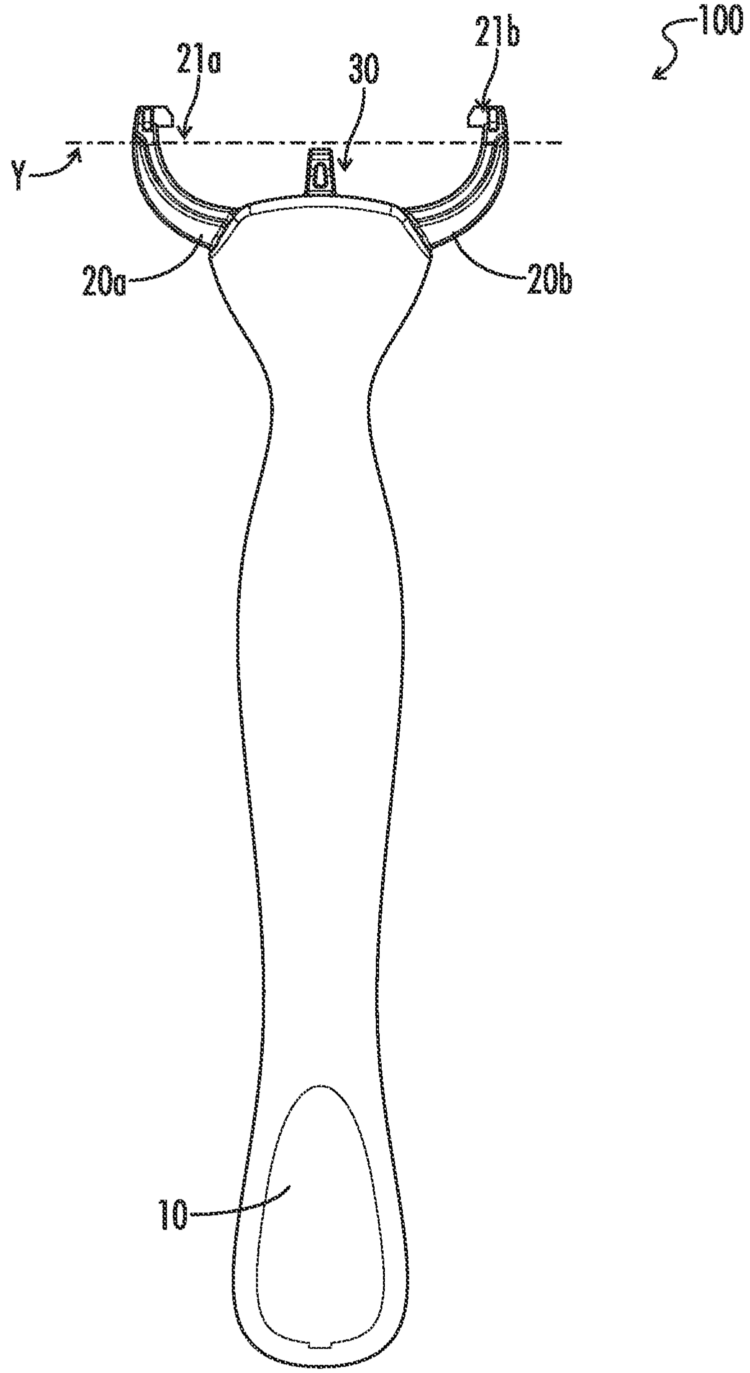
FIG. 2 shows a front view of a dual sided disposable razor with a narrow barrier, in accordance with another embodiment of the present disclosure.

Embodiments, of the present disclosure, will now be described with reference to the accompanying drawing.

Embodiments are provided so as to thoroughly and fully convey the scope of the present disclosure to the person skilled in the art. Numerous details are set forth, relating to specific components, and methods, to provide a complete understanding of embodiments of the present disclosure. It will be apparent to the person skilled in the art that the details provided in the embodiments should not be construed to limit the scope of the present disclosure. In some embodiments, well-known processes, well-known apparatus structures, and well-known techniques are not described in detail.

The terminology used, in the present disclosure, is only for the purpose of explaining a particular embodiment and such terminology shall not be considered to limit the scope of the present disclosure. As used in the present disclosure, the forms “a”, “an” and “the” may be intended to include the plural forms as well, unless the context clearly suggests otherwise. The terms “comprises”, “comprising”, “including” and “having” are open-ended transitional phrases and therefore specify the presence of stated features, elements, modules, units and/or components, but do not forbid the presence or addition of one or more other features, elements, components, and/or groups thereof. The particular order of steps disclosed in the method and process of the present disclosure is not to be construed as necessarily requiring their performance as described or illustrated. It is also to be understood that additional or alternative steps may be employed.

When an element is referred to as being “mounted on”, “engaged to”, “connected to” or “coupled to” another element, it may be directly on, engaged, connected or coupled to the other element. As used herein, the term “and/or” includes any and all combinations of one or more of the associated listed elements.

Terms such as “inner”, “outer”, “beneath”, “below”, “lower”, “above”, “upper” and the like, may be used in the present disclosure to describe relationships between different elements as depicted from the figures.

Referring to FIGS. 1-28 a dual sided disposable razor or a system razor 100 will now be described, in accordance with an embodiment of the present disclosure. The dual sided disposable razor and system razor 100 comprises a handle 10 which extends vertically with a first side 10*a* and a second side 10*b*. The first side 10*a* and the second side 10*b* have a symmetric profile about a vertical handle 10 axis X that passes through the centre of the handle 10. This allows the same level of comfort to the user while shaving with either 1st side of the cartridge of blades 41*a*, 41*b*, 41*c*, 41*d* of the cartridge 40 or the 2nd side of the cartridge of blades 41*a*, 41*b*, 41*c*, 41*d* of the cartridge 40.

The dual sided disposable razor and system razor 100 has arms 20*a*,20*b* integral with the handle 10 and projecting sideways from the top end of the handle 10 to allow grasping of a cartridge 40 that carries blades 41*a*, 41*b*, 41*c*, 41*d* on both sides of the cartridge. A first pivot 21*a* extends horizontally from an end of the first arm 20*a*. The blades 41*a*, 41*b*, 41*c*, 41*d* configured on both sides of said cartridge 40 are made of steel and the blade carrier and blades can flex and move over different contours of the user's skin this will help to comply with the irregularities of the contour of a shaved surface. Similarly, a second pivot 21*b* extends horizontally from an end of the second arm 20*b*. Both the first pivot 21*a* and the second pivot 21*b* facilitate rotation of the cartridge 40 along a common pivot axis Y, which biases the cartridge 40 either to the first side or the second side of the handle 10 depending if the 1st side cartridge is being used or the 2nd side of the cartridge is being used. This enables switching between the blades 41*a*, 41*b*, 41*c*, 41*d* disposed on the first side 10*a* and the blades on the second side 10*b* of cartridge as desired by the user. This enables optimum usage of the dual sided disposable razor and system razor 100 as well as renders the dual sided disposable razor and system razor 100 affordable. In another embodiment, the arms 20*a*,20*b* and the cartridge are detachably attached to the handle 10 in a system razor version.

A wide flexible barrier 30 is provided on the top end of the handle 10 so as to avoid inadvertent switching of sides by the user. The barrier 30 protrudes vertically from the top end of the handle 10. The barrier can be any shape or size and be stiff or flexible and can be made of any material. The barrier can have wide base or flange and narrow top or a wide top and narrow base and it can have holes in it and beany number of parts or materials. In another embodiment, the flexible barrier 30 is a narrow barrier 30 as shown in the FIG. 2. The barrier 30 resiliently deforms under action of a swiveling force applied by the user. In another embodiment, the barrier 30 has a smooth rounded profile for ease of switching. The barrier can be any shape or size and made of any material.

A deflector 60 is provided at the center of the top end of the handle 10 on a disposable razor version and be on the top end and the middle of the swivel arms that are attached to the two sided razor cartridge for a system razor which the razor cartridge is removable from the handle. The deflector can be any shape or size and be made of any material and it helps to prevent inadvertent switching between the first side 10*a* and the second side 10*b* as the deflector 60 interacts with the barrier 30. However, when a preset force acts on the deflector 60, the deflector 60 resiliently deforms to allow biasing of the sides 10*a*,10*b* of the dual sided disposable razor and system razor 100 as desired by the user, as shown in the FIGS. 1,2,4 and 5. The deflector 60 can be stiff and not move and not be able to resiliently deformed. The height difference from the deflector 60 and barrier 30 are at a longer distance from each other than if the deflector 60 and barrier 30 where directly above each other and vertical. This longer distance between deflector 60 and barrier 30 at the vertical point when the deflector 60 is above the barrier 30 creates a resistance. This way when the deflector 60 passes over the barrier 30 to switch the 1st side shaving side of the cartridge to the second shaving side of the cartridge the deflector 60 interacts with the barrier 30 while passing from the 1st shaving side to the 2nd shaving side. The barrier 30 acts like a barrier and it will keep the 1st shaving side on the 1st shaving side and or keep it on the second shaving side when the user wants to use the 1st or 2nd shaving side. In another embodiment, as shown in the FIGS. 14-16 a cavity 62 is defined into the inner surface of each of the arms 20 to engage with the deflector on the bottom of the cartridge 40. This cavity 62 and deflector 60 can be located anywhere on or in the razor cartridge 40 and on or in the arms 20 and be any shape size or design to function in the same manner. This way when the deflector 60 passes over the cavity 62 to switch the 1st side shaving side of the cartridge to the second shaving side of the cartridge the deflector 60 interacts with the cavity 62 while passing from the 1st shaving side to the 2nd shaving side. The cavity 62 acts like a barrier and it will keep the 1st shaving side on the 1st shaving side and or keep it on the second shaving side when the user wants to use the 1st or 2nd shaving side. This deflector 60 and cavity 62 can be used in conjunction with the deflector 60 on the bottom of the cartridge and the barrier 30 described in this application or one way can be used only or both ways. The deflector 60 and the cavity 62 can be located anywhere in or on the arms 20 or in or on the razor cartridge 40. It can be any shape or design to serve the same function. The location of the deflector 60 and the cavity 62 can be have 2 or any number of deflectors 60 and 2 or any number of cavity 62. In one embodiment there could be 2 deflectors 60 and 1 cavity 62 and each deflector 60 can be located off center as compared the deflector 60 shown in FIG. 14. The location of the deflector 60 off center can be any position and it allows the cartridge 40 to be in the right position, angle or degree relative to the handle so the user can start shaving the 1st shaving side of the cartridge. When the blades are dull and the user wants to start using the 2nd shaving side of the cartridge, the user can move or tilt the cartridge in the opposite direction or position of the 1st shaving side cartridge 40 and 1st position of the deflector 60 will pass the cavity or barrier 62 and then while its still tilting in the opposite direction of shaving side 1 it will pass the 2nd position of the deflector 60 and now the razor cartridge will be in the perfect angle, position or degree relative to the handle so the 2nd side of shaving can be in the correct position and be used. These deflectors 60 and cavities 62 help keep the cartridge on the 1st shaving side or the 2nd shaving side and helps keep the razor cartridge 40 in the right position for shaving the 1st shaving side of the cartridge and for the 2nd shaving side of the cartridge 40. The deflector 60 and cavity or barrier 62 can be any shape or design or be any type of material. In still another embodiment, as shown in the FIGS. 17 and 18, each of the arms 20 are configured without any cavity and can function and have all the features like described for FIGS. 14, 15 and 16 above.

In another embodiment, the swivel arm 20 and cartridge 40 are configured to be in a correct starting angle/position to begin shaving, which aides and allow easy handle 10 and cartridge 40 attachment for the consumer. The engagement between the cavity of each side of the cartridge 40 shown in FIG. 17 and the swivel arm prong shown in FIG. 18 can have many benefits to the two-sided razor and FIG. 11 and FIG. 14-18. The inside cavity can have prongs, protrusions or cavities that and can interact with prongs, ratchet, gears, protrusions or cavities on the prong of the swivel arm that goes insides the cavity on each end of the cartridge. These prongs, ratchet, gears, protrusions or cavities can be at any degree on a 360-degree radius on the prong and the cavity and there can be one to any number. This will inhibit the swivel arm to swing freely from one side to the other and allow for an easier connection for the consumer. These prongs, ratchet, gears, cavities or protrusions on the swivel arm and end cavities on the cartridge for example would be at 8 o'clock position on one side and 4 o'clock on the other side when the cartridge 40 and swivel arm is in the upright position. So when the user gets the two sided razor cartridge the cartridge and swivel arm will be in the 4 o'clock position and ready to be attached The cartridge and swivel can flex back any amount and this is just for visual reference.

When the first side is dull the user can disconnect the cartridge and move the swivel arm in the opposite direction toward 8 o'clock and then it will click past the prongs, protrusions or cavities on the swivel arm and the cartridge end cavity and the cartridge will now be in the right position and starting angle to use the second side of the cartridge. Now the cartridge can continue be flexible and swivel from the 8 o'clock position and upward toward 10 or 11 o'clock. The cartridge and swivel can flex back any amount and this is just for visual reference. This is embodiment can be used for the cartridge that has a deflector to pass to switch shaving sides and this can aide the deflector and keep the cartridge in the correct starting angle/position to begin shaving for the 1st shaving side of the cartridge and the 2nd shaving side of the cartridge. This embodiment can be used for any cartridge mentioned in this application or previous applications.

The floating/flexible blade cartridges 40 is configured to be constructed in regular as well as irregular shapes. If the blade can move or be flexible within a cartridge on both sides of a two sided razor to allow a close and comfortable shave, then it can be done with any combination described and or with any modifications.

The dual sided disposable razor and system razor 100 further comprises cushions 24 provided on an operative end of each of the first arm 20*a* and the second arm 20*b*. The cushions 24*a*,24*b* provide shock absorption during shaving by a user, as the cartridge 40 sides contact the surface of the arms 20*a*,20*b*, as shown in the FIGS. 6-8. (FIG. 6-8 does not show the cartridge 40 in contact with the arms)

The rubber on the swivel arm 20*a* or 20*b* can be any size shape or any material that is soft and gives the cushion. A type of rubber material can be chosen depending on the density that is required. The whole idea with rubber on the swivel arm 20*a* and 20*b* will be able to give the cartridge 40 support when it's in contact with the end caps 50. Disclosed in previous applications that the end caps have arms or legs 24*c*, 24*d*, 24*e*, 24*f* on both ends where it is in contact on two parts of the swivel arm FIGS. 6 24 an and 24*b* that touch the end caps as one side is used, then when the user flips or tilts the cartridge 40 so you can use the second side of shaving then the other set of rubber on the swivel arm 24 an and 24*b* is in contact with the end caps 50. This gives support while shaving so as the cartridge 40 can glide over different surfaces on the consumers face or skin or body but the cartridge 40 will be able to flex and move back-and-forth with comfort. The rubber can cover the entire swivel arm like in FIG. 8 or just be in sections like in FIG. 7 or any part of the swivel arm 20 and the swivel arm can be made of plastic with rubber sections or it could be any type of material or combination of materials. The endcaps 20 and end caps 50 can be any shape, size or design. The cushion areas can be one to any number of cushion areas and located anywhere on the arms 20 or end caps 50.

Figure 9:
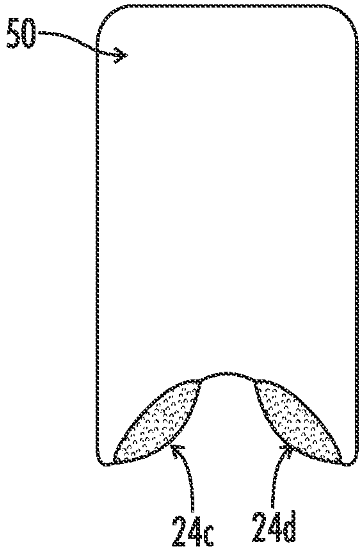
FIG. 9 shows a side view of an end cap of the FIG. 1 disposable razor with cushions and this end cap with cushions can be on a system razor cartridge that is removable from the handle.
Figure 10:
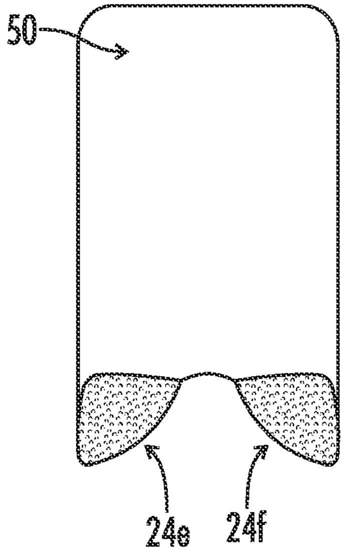
FIG. 10 shows a side view of an end cap of the FIG. 1 disposable razor with cushions and this end cap with cushions can be on a system razor cartridge that is removable from the handle, in another embodiment of the present disclosure.

Similarly, cushions 24*c*,24*d*,24*e*,24*f* are provided at the bottom of the end caps to enhance shock absorption, as shown in FIGS. 9 and 10. The use of the end caps and the swivel arm areas 24*a* and 24*b* eliminates reliance on dedicated tracks like 24*g* that need to be provided if used with a pushpin. The rubber or cushion areas on the caps can be any size shape, design or any material that is soft and gives the cushion. A type of rubber material can be chosen depending on the density that is required. The whole idea with rubber on the end caps will be able to give the cartridge support when it's in contact with the swivel arm 20. The end caps 50 can have rubber or cushion material the swivel arms 20 can have rubber or cushion areas or one can have the rubber or cushion material and the other parts can be solid and have no cushion materials. In one embodiment the end caps 50 have arms 20 on both ends where 24*a* and 24*b* rubber and rubber and cushion areas are in contact with two parts of the end caps 50, 24*c* or 24*e* which can have been solid material or have cushion material. When the 1st shaving side is dull and used then the user can flip the cartridge 40 in the opposite direction so you can use the second shaving side of the cartridge 40. When this happens then the other set of rubber or cushion areas 24*a* and 24*b* that are opposite sides of 24*a* and 24*b* are in contact with two parts of the end caps 50, 24*d* or 24*f* of the end caps 50. This gives support while shaving so as the cartridge glides over different surfaces on the consumers face or skin or body but the cartridge will be able to flex and move back-and-forth with comfort. The rubber can cover the entire area of the end cap 50 like shown in FIG. 10 or just be in sections like shown in FIG. 9. or be in any part of the end cap 50. The end cap 50 can be made of plastic with rubber sections or it could be any type of material or combination of materials. The end cap 50 could be any shape or size End caps 50 are attached on the ends of said cartridge 40. A first groove 52*a* and a second groove 52*b* are configured on the bottom portion of each of the end caps 50 to restrict the cartridge 40 to either the first side 10*a* or the second side 10*b*, thereby preventing inadvertent switching by the user, as well as switching when desired by deliberate application of force or pressure as shown in the FIGS. 19 and 20.

Figure 20:
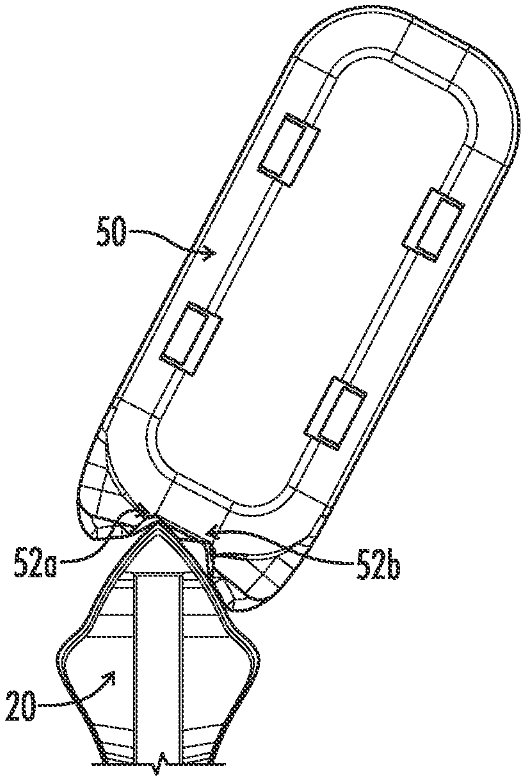
FIG. 20 shows a side view of the end cap of the FIG. 19 assembled with the arm.
Figure 21:
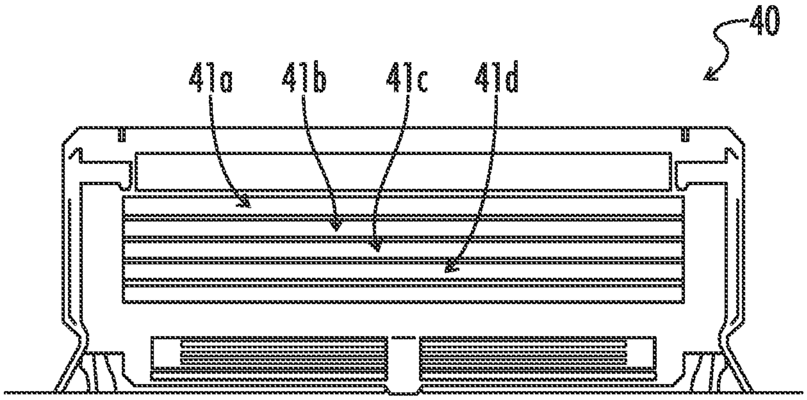
FIG. 21 shows a front view of the cartridge of the FIG. 1 disposable razor having flexible blades or system razor cartridge that is removable from the handle having flexible blades.

FIG. 20 shows that a top portion of the swivel arm 20 is pointed and that the end cap 50 or the portion that holds the cartridge together on the ends and this could be part of the cartridge it might not be an end cap 50 it could be part of the cartridge design that it has the shapes that it has pockets 52*a* and 52*b* and has a deflector in between those two and then you have the top portion of the swivel arm 20 and when you shave with the first side the top of the swivel arm 20 is in cavity 52*a* and when the user switches sides the top portion of the swivel arm 20 is in cavity 52*b*.

When the user shaves the cartridge 40 end caps 50 and the portion 24*c*, 24*d*, 24*e* and 24*f* rest against the swivel arm 24*a* and 24*b* portions to give the cartridge 40 support while shaving and the 52*a* and 52*b* pockets or cavities can keep the cartridge 40 on the 1st shaving and prevent it from switching to the 2nd shaving side of the cartridge until the user wants to switch shaving sides. The rubber or cushion material on the end caps 5 or swivel arm 20 gives support while shaving so as the cartridge glides over different surfaces on the consumers face or skin or body but the cartridge will be able to flex and move back-and-forth with comfort. Regarding FIG. 19 and FIG. 20 the design of the end caps 50 pockets & legs and swivel arm 20 can be any shape, any design and be made of any material and be any number of pieces. The end caps 50 in FIG. 19 and FIG. 20 can have no end caps and be clips or parts or any design to hold any number of cartridge 40 together.

Figure 11:
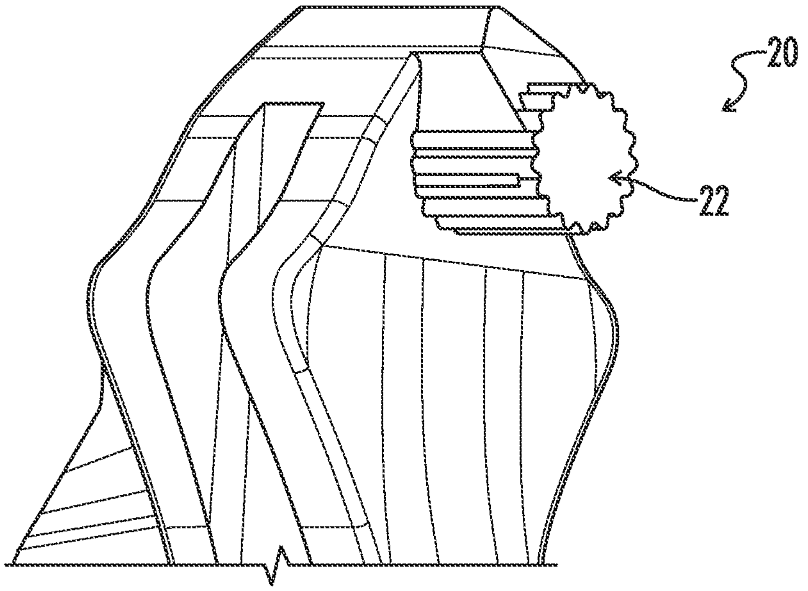
FIG. 11 shows an isometric view of an arm prong attached to an arm of the razor.
Figure 12:
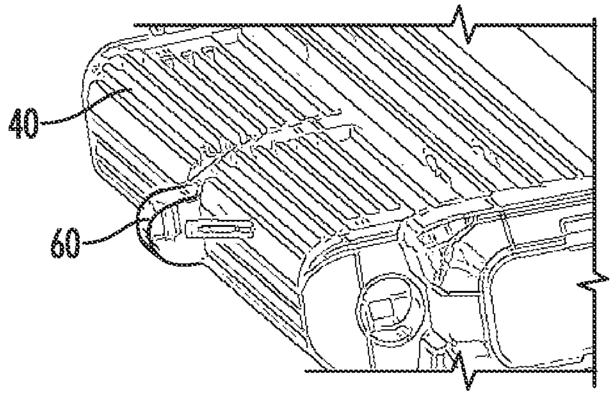
FIG. 12 shows an isometric view of a deflector attached to the cartridge.
Figure 13:
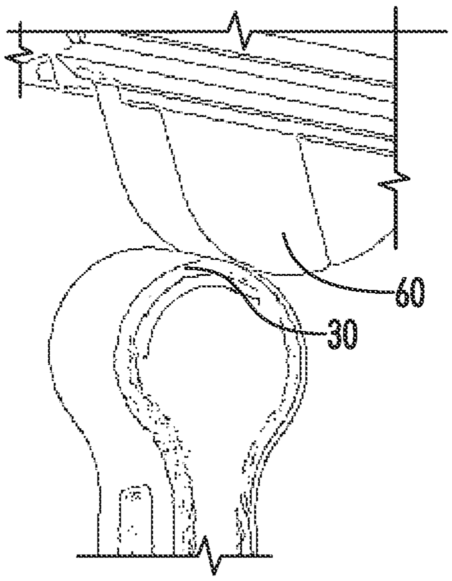
FIG. 13 shows an isometric view of interaction of a barrier disposed on a handle and a deflector disposed on the cartridge bottom of the razor of FIG. 1 disposable razor and a barrier disposed on a handle and a deflector disposed on the cartridge bottom of a system razor cartridge that is removable from the handle.
Figure 14:
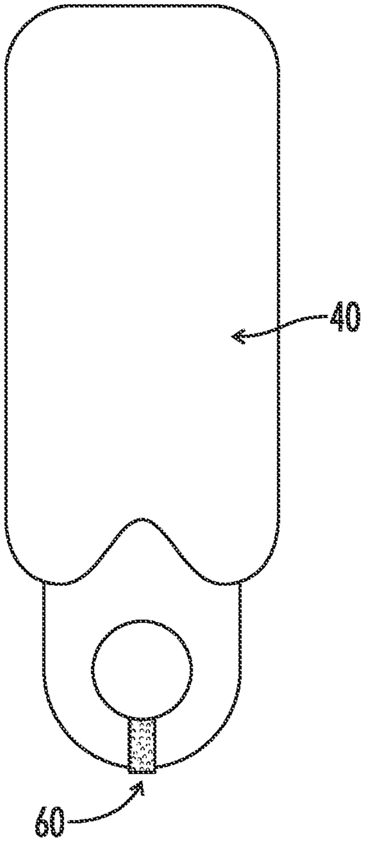
FIG. 14 shows a side view of the cartridge of the FIG. 1 disposable razor with a deflector or system razor cartridge that is removable from the handle with a deflector.
Figure 15:
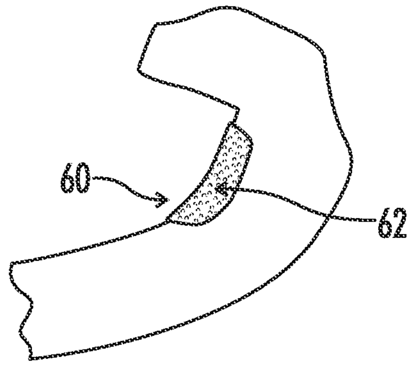
FIG. 15 shows a side view of the arm of the FIG. 1 disposable razor with a deflector and a cavity or system razor cartridge that is removable from the handle with a deflector and a cavity.
Figure 16:
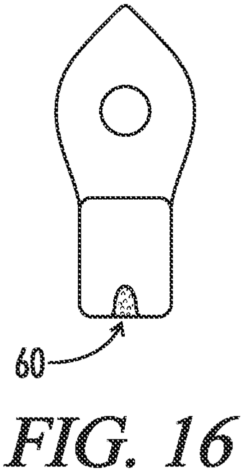
FIG. 16 shows a side view of the FIG. 15.
Figure 17:
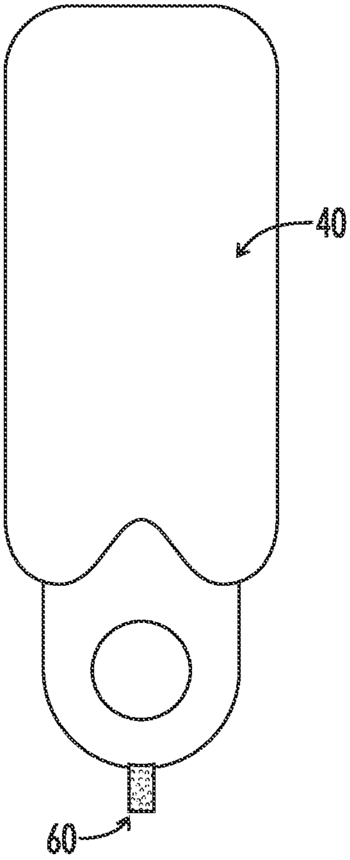
FIG. 17 shows another side view of the FIG. 14.
Figure 18:
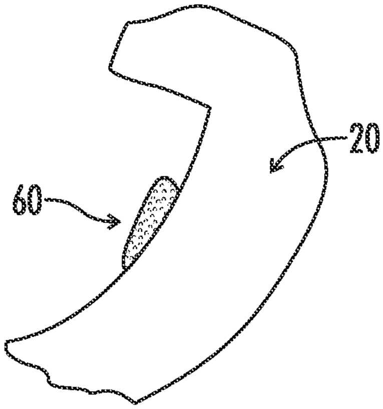
FIG. 18 shows a side view of the arm of the FIG. 1 disposable razor with a deflector in another embodiment of the present disclosure or system razor cartridge that is removable from the handle with a deflector in another embodiment of the present disclosure.
Figure 19:
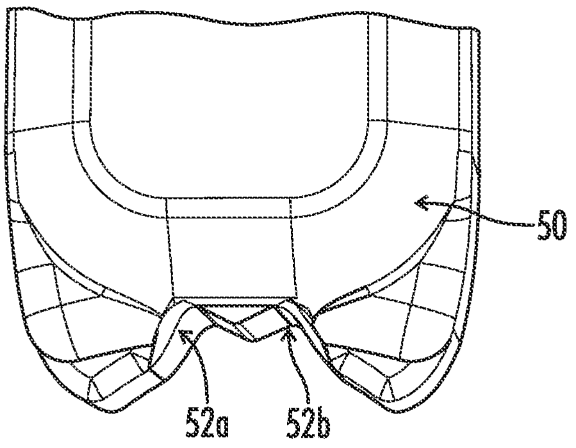
FIG. 19 shows a side view of an end cap with grooves, in another embodiment of the present disclosure.

Arm prongs 22 having a toothed profile as shown in the FIG. 11 are attached to each of said first arm 20*a* and said second arm 20*b*. This facilitates provision for mounting a ratchet while the arm prongs enact the pinion. Such a ratchet and a pinion arrangement allows for switching from the 1st shaving side and the 2nd shaving side so the cartridge 40 does not move freely and can be controlled by the gears in the prong 22 and the pinion inside the cartridge 40 (we need to show the hole in the cartridge 40). The holes in the cartridge 40 can have one to any number of gears as well or deflectors, barriers or cavities that interact with the prong 22. The prong can have one to any number of gears, cavities, deflectors or barriers. The prongs 22 and the cartridge 40 prong holes the area where the prongs go inside of can be any shape, any design, any function and any material. The prong 22 and cartridge 40 prong holes can have deflectors, barriers or cavities and be in the right position so the cartridge 40 is in the ideal 1st shaving side position relative to the handle. When the user moves the cartridge from the 1st shaving side position to the 2nd shaving side position, then the prong 22 and cartridge 40 prong holes can have deflectors, barriers or cavities and be in the right 2nd shaving side position so the cartridge 40 is in the ideal 2nd shaving side position relative to the handle The prong 22 in FIG. 11 shows a ratchet design so the cartridge 40 can be rotated at any angle or direction relative to the handle.

In an embodiment, the dual sided razor 100 is a disposable type.

In one embodiment the dual sided razor 100 is a system razor type where the cartridge can be removed and replaced from the handle with a new two sided razor cartridge.

Figure 3:
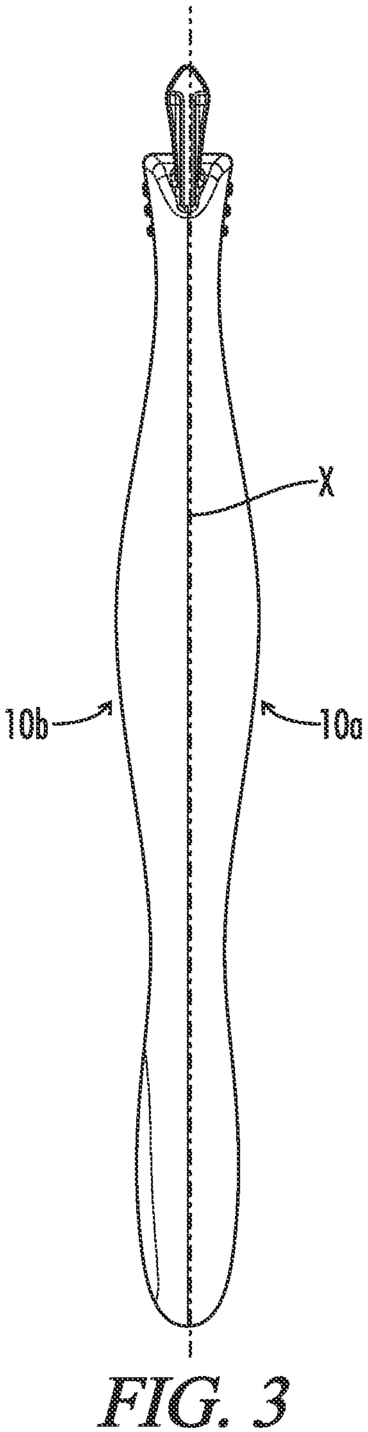
FIG. 3 shows a side view of the symmetric handle of FIG. 1.
Figure 4:
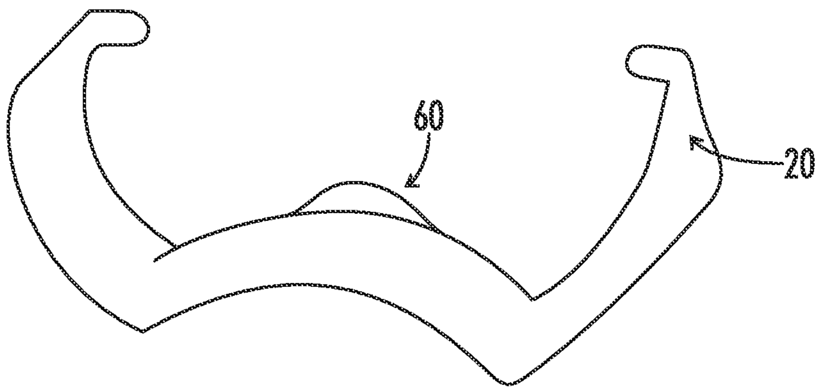
FIG. 4 shows a front view of the arms of a system razor cartridge that is removable from the handle.
Figure 5:
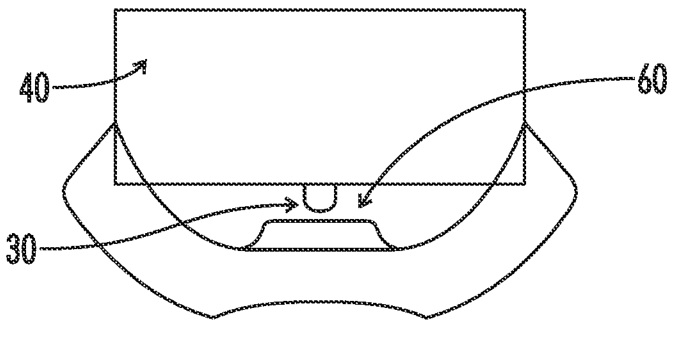
FIG. 5 shows a front view of the arms that are attached to a system razor cartridge that is removable from the handle.
Figure 6:
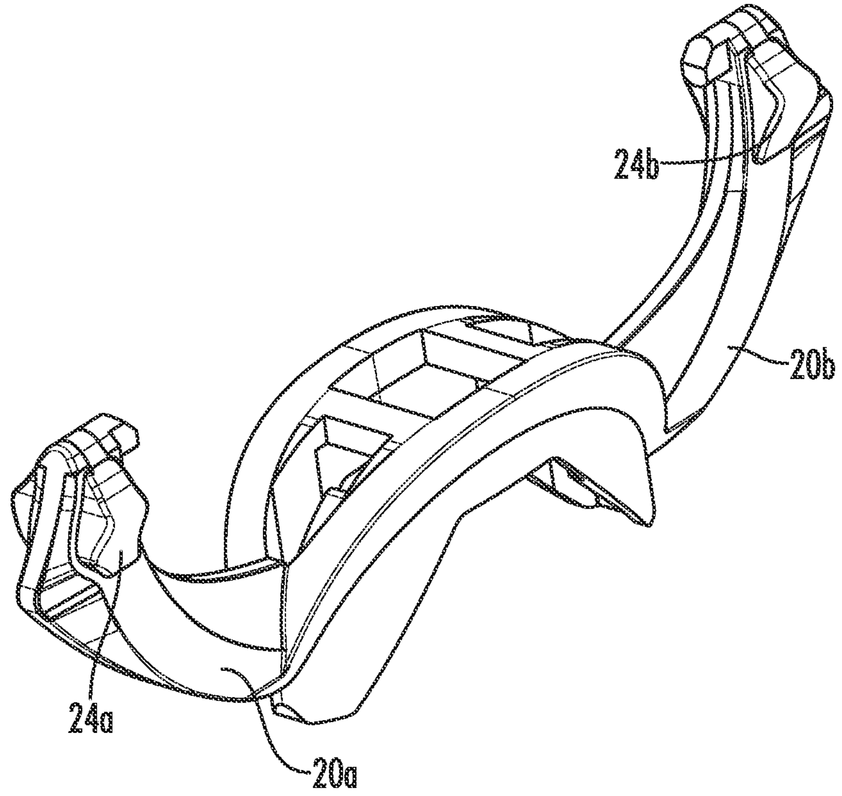
FIG. 6 shows an isometric view of the arms of a system razor cartridge that is removable from the handle with cushions. A disposable razor has these cushions on the arms on FIG. 1.
Figure 7:
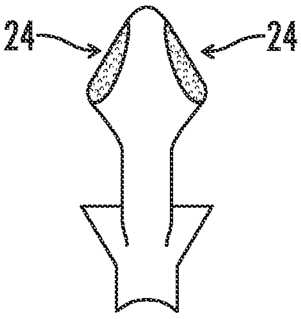
FIG. 7 shows a side view of the arms of the FIG. 6 with cushions, in another embodiment of the present disclosure.
Figure 8:
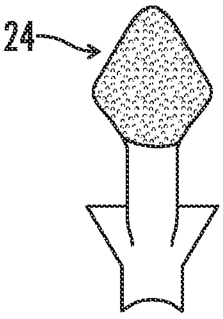
FIG. 8 shows a side view of the arms of the FIG. 1 with cushions, in another embodiment of the present disclosure.
Figure 22:
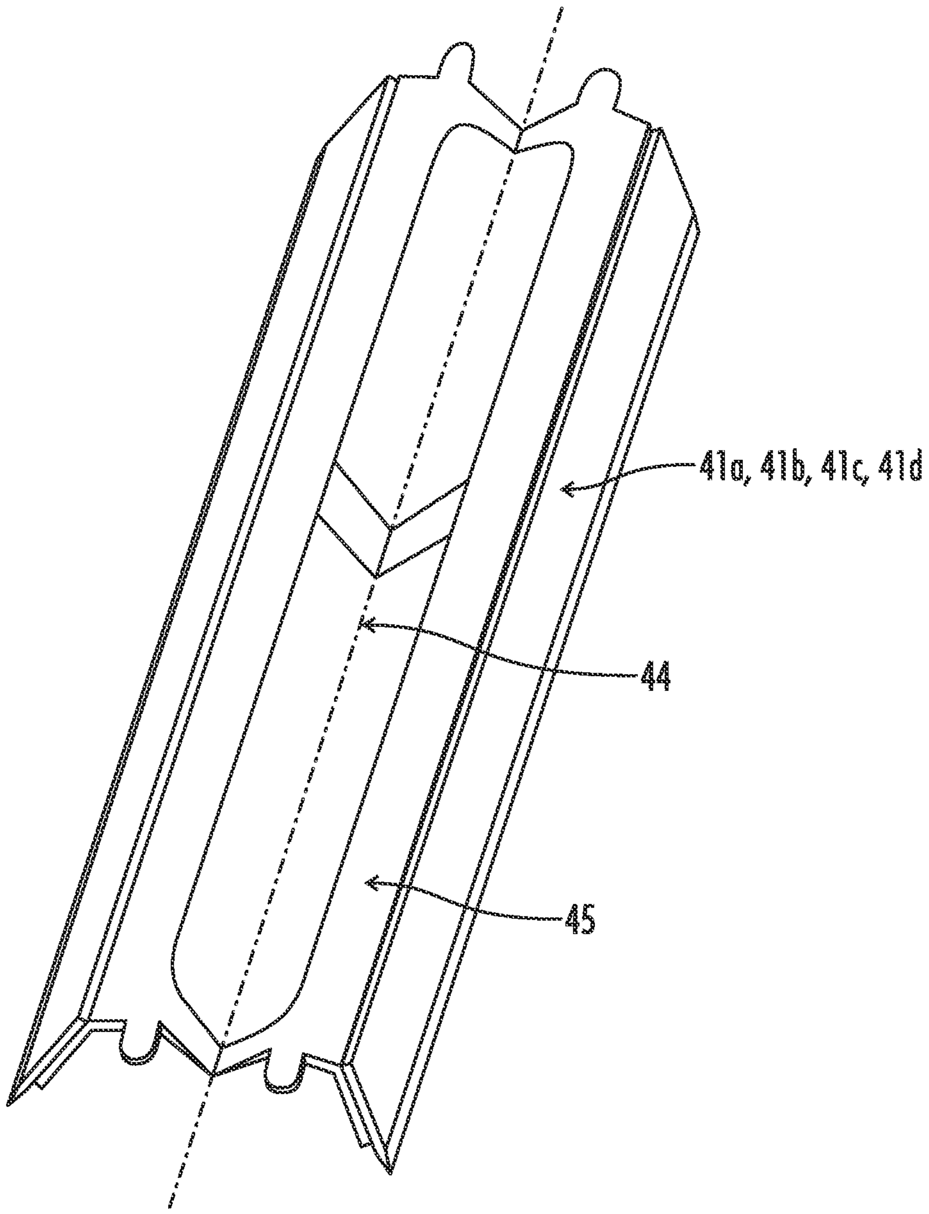
FIG. 22 shows blades welded to a blade carrier of the dual sided razor that can be flexed along a blade pivot axis.
Figure 23:
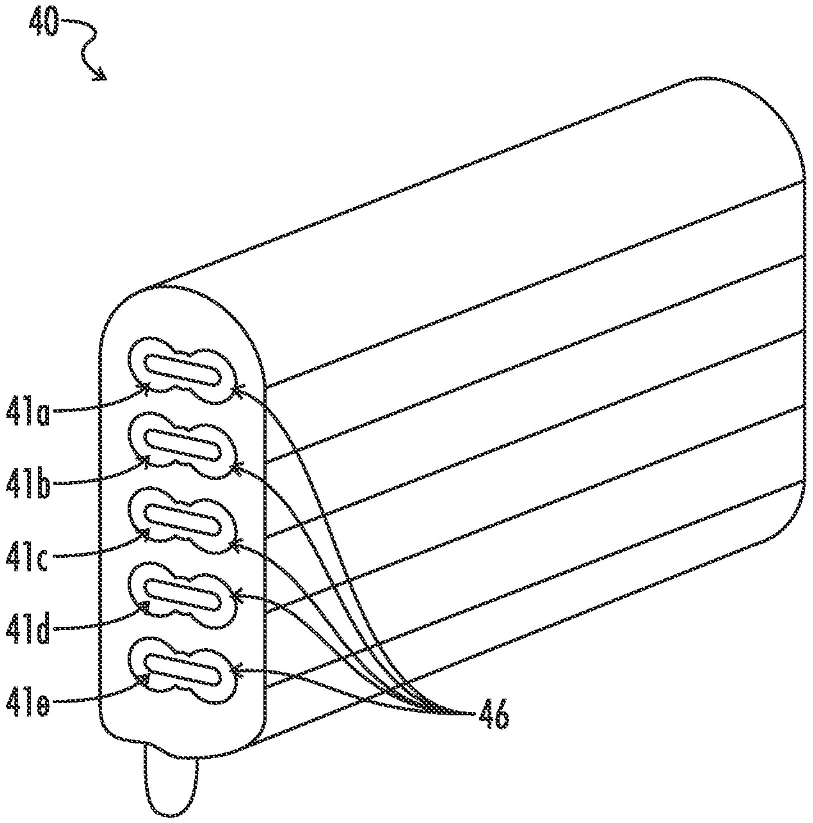
FIG. 23 shows one embodiment of a cartridge assembled with the flexible blades of FIG. 21.
Figure 24:
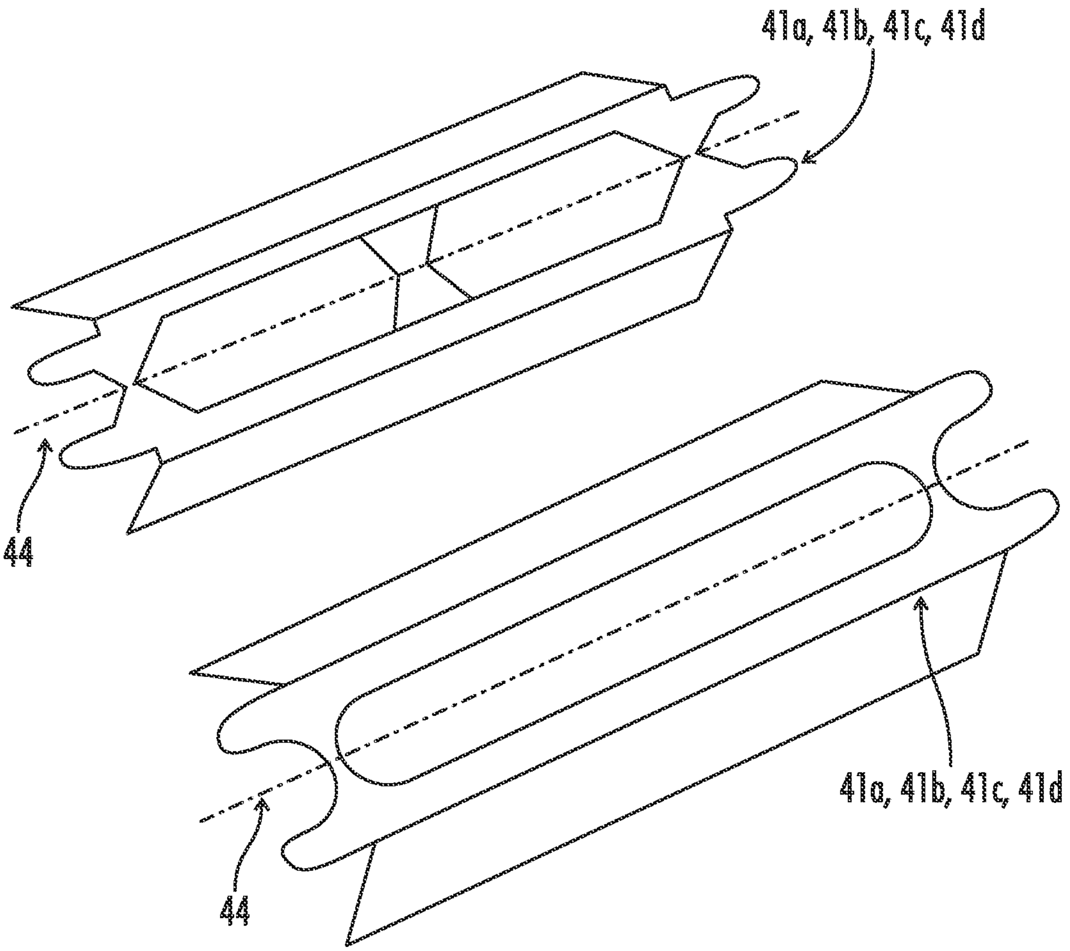
FIG. 24 shows another embodiments of the flex blades.
Figure 25:
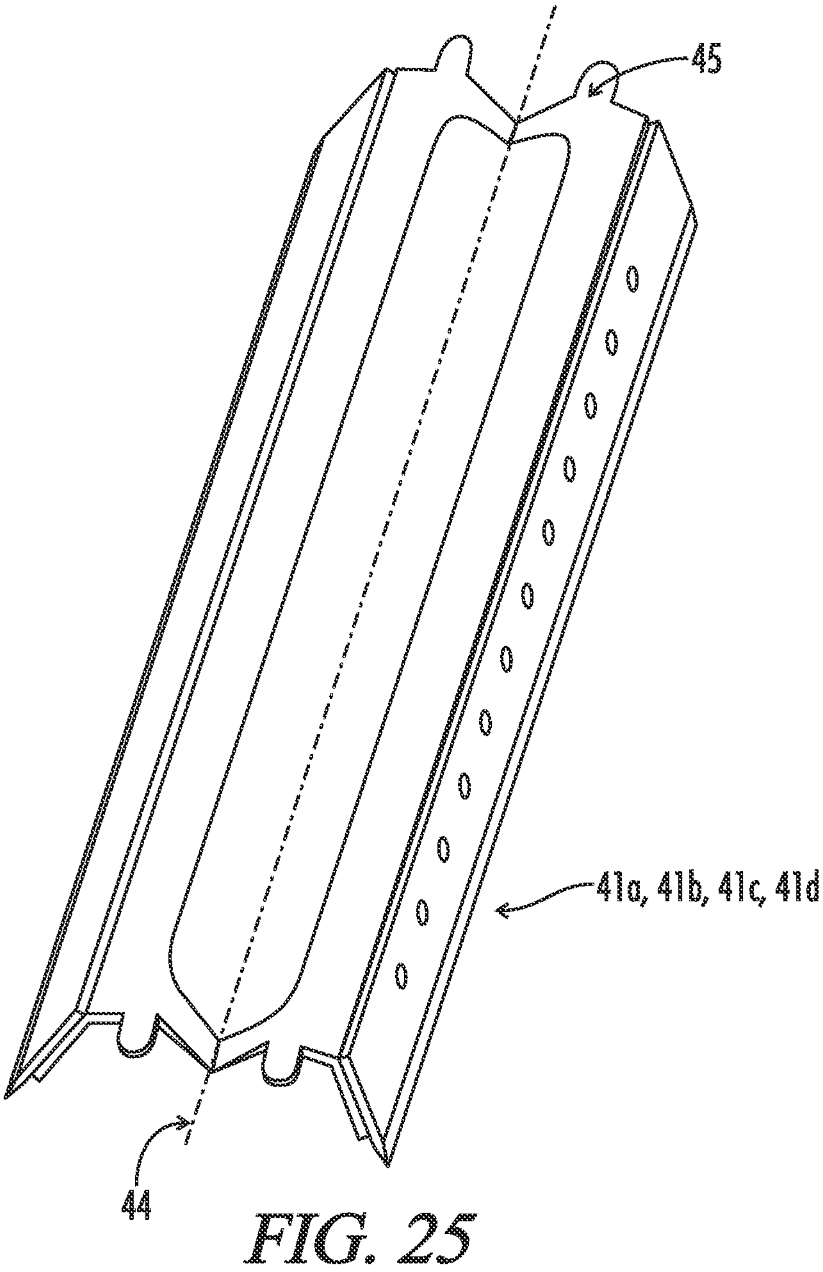
FIG. 25 shows yet another embodiment of the flex blades.
Figure 26:
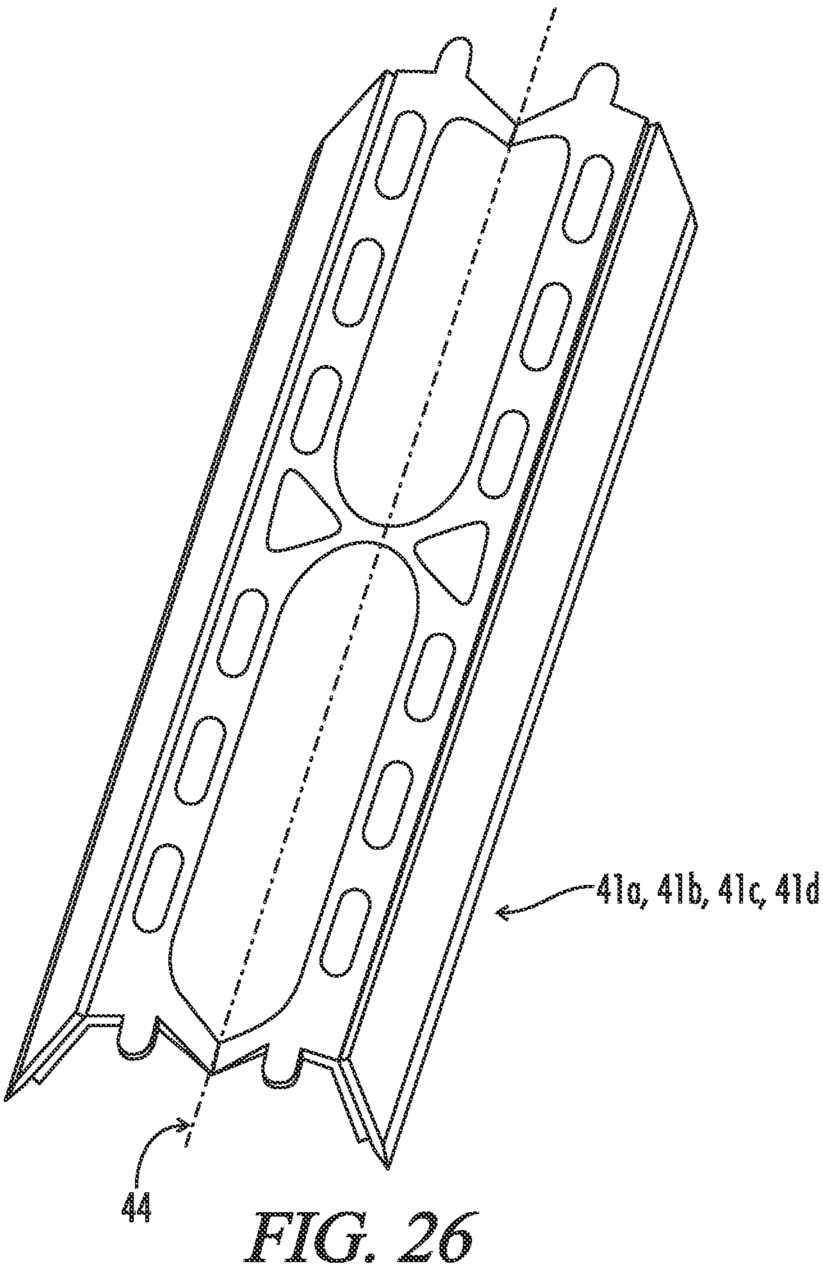
FIG. 26 shows another embodiments of the flex blades.
Figure 27:
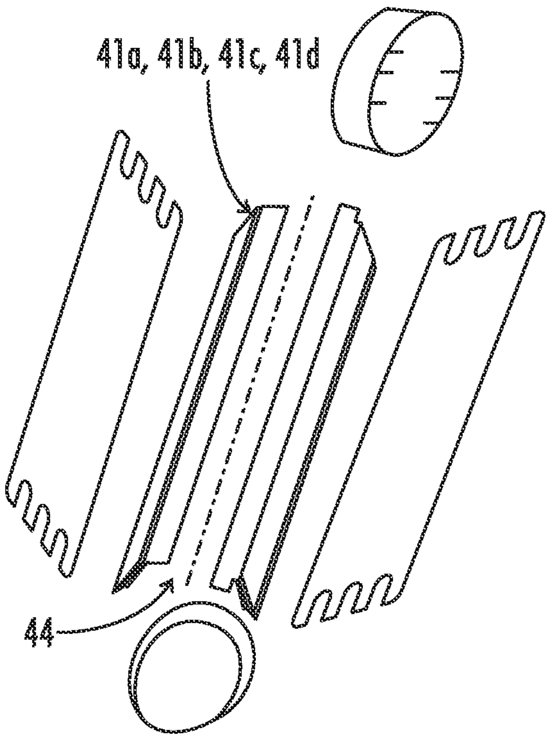
FIG. 27 shows blade pivot axis for pivoting the blades.
Figure 28:
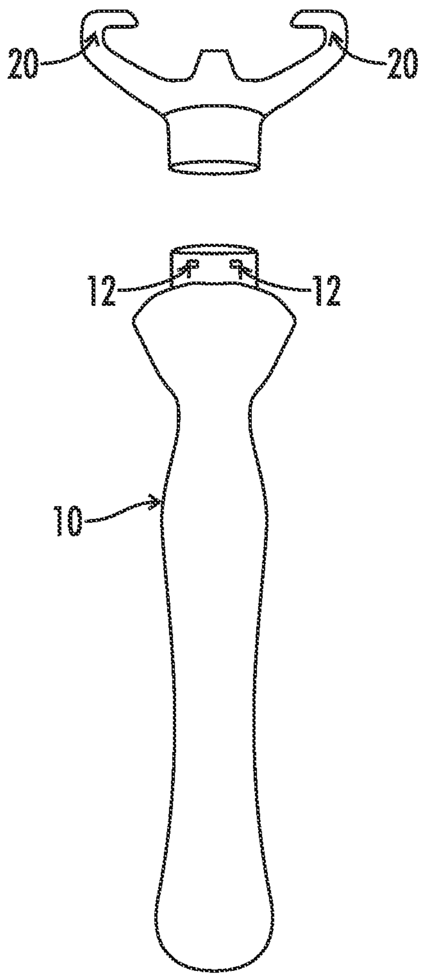
FIG. 28 shows a two way connection of handle and arms in a system razor cartridge and the swivel arm part is missing the cartridge attached.
Figure 29:
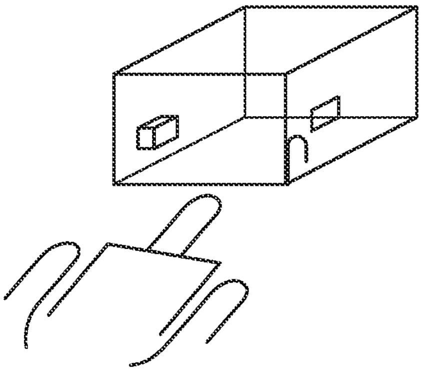
FIG. 29 shows a male or female connection area on the handle and cartridge connection area for connecting the two sided razor cartridge to the handle when shaving the $1^{st}$ side and when shaving the $2^{nd}$ side.
Figure 30:
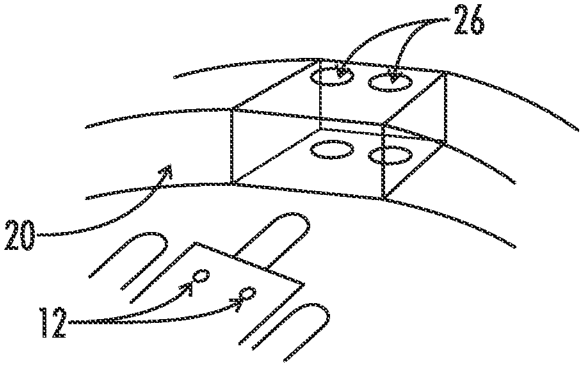
FIG. 30 shows a male or female connection area on the handle.
Figure 31:
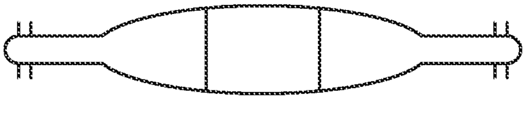
FIG. 31 shows the inside area of the cartridge connection that is connected to a handle.
Figure 32A:
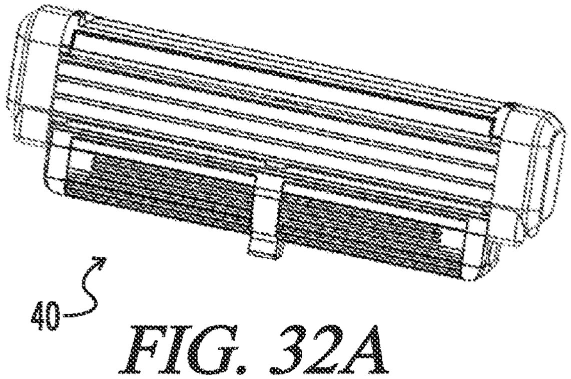
FIGS. 32A and 32B shows a two-sided floating blade—flexible blade cartridge with finger tabs.
Figure 32B:
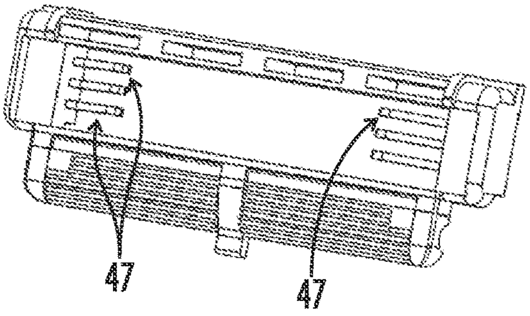

In another embodiment, the handle is as shown in FIG. 3;

The dual sided razor has floating or flexible blades (41*a*,41*b*,41*c*,41*d*,41*e* as shown in various embodiments shown in the FIGS. 24-27. which can be any number of blades on each shaving side of the two sided razor cartridge. The flexible blades are pivotable about a blade pivot axis (44) in either sense of rotation along the blade pivot axis 44. This results in upward or downward deflecting of the pivotable surfaces of blades. The blade pivot axis (44) location is variable with in the cartridge and designed to cater the needs of the user. In another embodiment, the flex blades 41*a*,41*b*,41*c*,41*d*,41*e* are floating blades axis can swivel either way possible and/or flex any way possible within the cartridge. The flex or floating blades attached to a blade carrier can use tabs (plastic or any material) on the cartridge on one side or both sides to aid in the movement of the blades and keep the blades in the proper blade exposure and correct razor geometry. The flex or floating blades 41*a*,41*b*,41*c*,41*d*,41*e* attached to a blade carrier can use the end caps to keep the blades in the proper blade exposure and correct razor geometry. The blade pivot axis (44) is provided on a blade carrier (45) as shown in FIG. 22. The blade carrier 45 as variable geometry with respect to design, shape, size, form, angle, thickness. The blade carrier 45 is made of a stiff material. FIG. 23 shows cartridge 40 having blades (41*a*,41*b*,41*c*,41*d*,41*e*) assembled into blade pockets (46). The blade pockets 46 are located at a variable location either inside the dual sided razor cartridge and or the end caps. These pockets 46 facilitate movement of the blades and maintain the blades in an optimum exposure configuration and razor geometry. The dimensions of the blade pockets (46) are such that during the rotation of the blades, can be any number of blades (41*a*,41*b*,41*c*,41*d*,41*e*), a clearance is provided so as to facilitate free rotation of blades while a user shaves. The blade pockets 46 in the cartridge or the end caps can areas where it keeps the blade in perfect blade exposure position and allows the blade to float and move over different skin contours or skin surfaces. The dimensions of each of said blades (41*a*,41*b*,41*c*,41*d*) are variable. In an embodiment as shown in the FIG. 27, the blades have bent profile along the width of the blades. In another embodiment as shown in the FIG. 27, the bent blades have extended edges The dual sided razor (100) is configured with retention bumps (12) that are provided on the handle (10). The retention bumps (12) are configured to be inserted into recess (26) provided on swivel arms (20) as shown in FIGS. 26-28. This facilitates ease of assembly as well as disassembly of the cartridge 40 and the handle 10.

The switching of the handle between the first shaving side 10*a* or the second shaving side 10*b* is achieved by the user without detaching the cartridge 40 from the handle 10. To switch sides of the holding position of the handle from 10*a* to 10*b*, the user simply grasps the handle 10 in the 10*a* position and rotates it until the handle 10*b* is in the user hand ready for using the 2nd shaving side. To switch the cartridge 40 shaving sides from the 1st shaving side to the 2nd shaving side the user simply holds the handle and applies pressure in the direction at the top end of the cartridge 40 rests on a surface and pushes so the cartridge 40 tilts from the 1st shaving side of the cartridge 40 position relative to the handle to the 2nd shaving side of the cartridge 40 position relative to the handle. Now the handle 10*b* and the cartridge 40 is the correct position to begin shaving the 2nd shaving side of the cartridge 40. This facilitates rotation of the cartridge 40 about the axis Y of the first pivot 21*a* and the second pivot 21*b*. As a result of this rotation the barrier 30 comes in contact with the deflector 60, and as the intensity of pressure applied the user increases further, a snapping action takes place which results in switching between the first side 10*a* and the second side 10*b* of the cartridge 40.

In another embodiment to switch the cartridge 40 shaving sides from the 1st shaving side to the 2nd shaving side the user simply holds the handle with one hand and can hold the cartridge 40 ends or end caps 50 and manually apply pressure in the opposite direction the cartridge 40 is angled or tilted (1st shaving side position) until the cartridge 40 is tilted and angled in the opposite direction of the 1st shaving sided position so it can be in the 2nd shaving side position relative to the handle. Now the handle 10*b* and the cartridge 40 is the correct position to begin shaving the 2nd shaving side of the cartridge 40. This facilitates rotation of the cartridge 40 about the axis Y of the first pivot 21*a* and the second pivot 21*b*. As a result of this rotation the barrier 30 comes in contact with the deflector 60, and as the intensity of pressure applied the user increases further, a snapping action takes place which results in switching between the first side 10*a* and the second side 10*b* of the cartridge 40. The way the user switches from the 1st shaving side to the 2nd shaving side can be done any way possible to achieve the same effect.

In another embodiment as shown in the FIGS. 32A-39, blade fingers 47 are provided on each of the rear portion of the blades 41*a*,41*b*,41*c*,41*d*. The blade fingers 47 offers a cushioned support to the blades 41*a*,41*b*,41*c*,41*d* to facilitate accurate traversing of curved surfaces of the face of the user. The blade fingers 47 allow the blade 41*a*,41*b*,41*c*,41*d* to rest on the blade fingers 47 on both ends of the cartridge 40 and when the user shaves, the blades 41*a*,41*b*,41*c*,41*d* are able to move as it goes over different contours and surfaces thus allowing for less irritation and add more comfort while shaving. Blade fingers 47 are known in the market, but this invention allows a single cartridge 40 to have two sides of shaving and both sides of the cartridge 40 has blade fingers 47, which is currently not used in the market. In another embodiment as shown in the FIG. 32B, the cartridge 40 does not have not have cartridge ribs 49 in the center of the cartridge 40. In another embodiment, the cartridge 40 has cartridge ribs 49 as shown in FIGS. 33, 34,37 and 38 to offer support to the cartridge 40. In an embodiment the location of the cartridge ribs 49 is variable along the cartridge 40. In another embodiment, the geometry of the cartridge ribs 49 is regular or irregular shape. If the blades are inserted from the backside of the cartridge 40 then there would be no cartridge ribs 49 in the front face of the cartridge 40.

Currently, the razors available in the market have the blades inserted from the front side. So there are many advantages to this new two sided razor design to be able to adapt to current razor cartridge 40 assembly machines. Having two assembly lines like the standard single sided razor cartridge assembly lines that hold one side or half of the two-sided razor cartridge and then join them together at the end of the cartridge automation assembly line. This way of assembly is more practical which utilizes the current assembly line equipment without having to be modified, thus will be easier to be manufactured instead of designing a new manufacturing equipment. In an embodiment, the dual-sided razor cartridge 40 is configured to constructed so the blades are inserted and assembled from the backside of each two-sided cartridge 40 instead of the front side.

The blade tabs 43 allow holding the blades 41*a*, 41*b*, 41*c*, 41*d* in place. The blade tabs 43 are constructed in any irregular as well as regular shape having a variable size and are variably located on the cartridge 40. In an embodiment, the number of blade fingers 47 per side is variable. The blade fingers 47 are oriented at an angle which is variable. The blade tabs 43 allow the blades 41*a*, 41*b*, 41*c*, 41*d* to flex and move as the user shaves over different contours of their skin. It can also move any direction that makes the shave close and comfortable. The blade tabs 43 are constructed to help hold and keep each blade 41*a*, 41*b*, 41*c*, 41*d* in perfect geometry, and as the user shaves, the blades 41*a*, 41*b*, 41*c*, 41*d* are configured to be moved along with blade tabs 43, and when the user stops shaving, the blade tabs 43 go to the blade and finger resting position. The rest position of the blade 41*a*, 41*b*, 41*c*, 41*d* are set to have the perfect razor geometry, angle, span, BTA, gap etc. The two cartridges 40 are connected together by the end caps 50, aluminum clips or sole clips or a means of connection between the two cartridge sides, including snap fit, ultrasonic welding or other means to connect two halves together. One side can have one to any number of finger tabs 43 and the other side has none or at least one blade tab 43.

Figure 33:
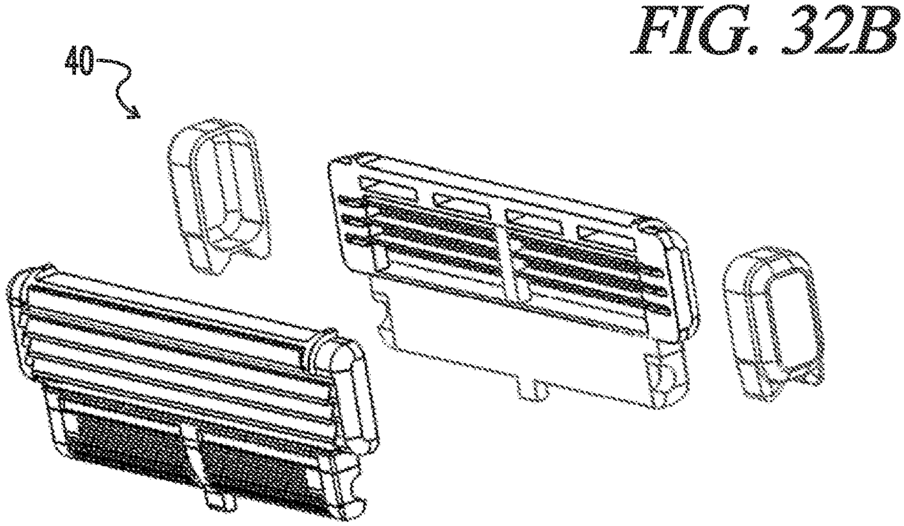
FIG. 33 shows an exploded view of a two sided floating blade—flexible blade cartridge with finger tabs on both sides and when assembled the blades are inserted from the front side.

In another embodiment as shown in the FIGS. 33, an exploded view of a dual-sided razor 100 flexible—floating blade cartridge 40 that has flexible blade fingers 47. It shows end caps 50 that enclose the two cartridges halves together. The two cartridge halves are attached together by including snap fit, ultrasonic welding or other means to connect two halves together. The end caps 50 are configured with grooves or slots or features to help hold the blades in the perfect and consistent geometry. The retention of the end caps 50 is designed in a way possible and is either permanent or removably attached.

The outside areas of the end caps 50 are configured to interact with the swivel arm 20. Depending on the size of the contact area of each end cap leg or prong 22 and the sizes of the contact area of the swivel arm 20 will determine the angle of the cartridge 40 relative to the handle 10 during shaving. The cartridge end caps 50 and any other cartridge end caps 50 have this feature as disclosed in this application. The end caps are configured to be constructed having a regular as well as an irregular shape and made of a suitable material from the group consisting of plastic, rubber, aluminum or steel.

Figure 34:
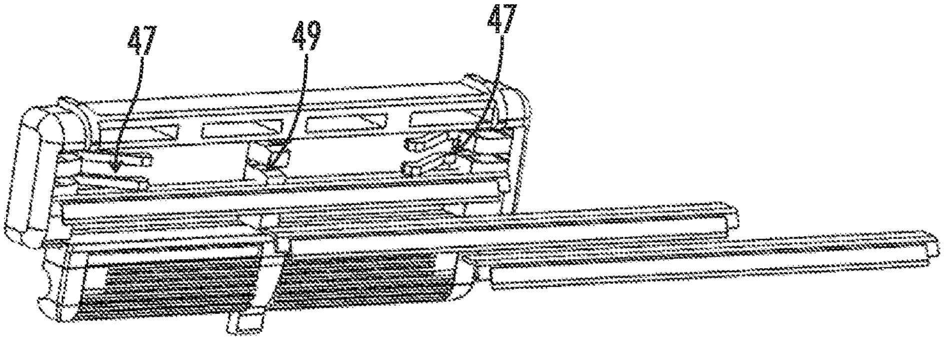
FIG. 34 shows a two-sided floating blade—flexible blade cartridge with finger tabs and shows blades inserted in from the front of the cartridge face.
Figure 35:
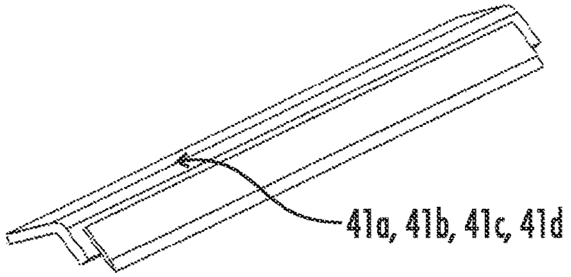
FIG. 35 shows a welded blade to a blade carrier.

Another embodiment of the present disclosure is shown in the FIG. 34 shows blades 41*a*, 41*b*, 41*c*, 41*d* welded being inserted from the front of the cartridge 40 and resting on the blade fingers 47. Even though it shows blades 41*a*, 41*b*, 41*c*, 41*d* enter from the front side the dual sided razor 100 is configured to be constructed to enter from the backside. FIG. 35 shows a welded blade 41*a*, 41*b*, 41*c*, 41*d* to a blade carrier that fits in the cartridge 40. The blade carrier 45 is configured with variable size, shape thickness, design and any angle. The blade 41*a*, 41*b*, 41*c*, 41*d* is configured to be welded or attached any other way known today or developed in the future. The blade 41*a*, 41*b*, 41*c*, 41*d* is configured to be bent to the shape shown in FIG. 35 and not use a blade carrier 45, so it will only use a bent blade 41*a*, 41*b*, 41*c*, 41*d*. When both blade 41*a*, 41*b*, 41*c*, 41*d* and blade carrier 45 are inserted in the razor cartridge 40, a spacing is configured between the two pieces to allow for good rinsibility between the two sides and between each level of blades 41*a*, 41*b*, 41*c*, 41*d* within the cartridge 40. The blade carrier horizontal ends opposite the blades 41*a*, 41*b*, 41*c*, 41*d* is configured with half arch construction or any shape to allow for more rinsibility between the two sides and between each level of blades 41*a*, 41*b*, 41*c*, 41*d* within the cartridge 40. The blade carrier 45 described in this application is configured variable is size, shape or angle and be made of steel or a suitable material. The blade 41*a*, 41*b*, 41*c*, 41*d* and the carrier 45 are configured like a bent blade41*a*, 41*b*, 41*c*, 41*d*. The blade 41*a*, 41*b*, 41*c*, 41*d* is configured to be welded or attached to the blade carrier 45. The thickness of the blade carrier 45 is important and can be any thickness, the blade thickness makes the blade carrier stronger and when the blade is attached and inserted in the razor cartridge 40 then the blade carrier will not bend inward or outward and be flat and strong. The blade carrier 45 is constructed designed to bend so when the user shaves the blade carrier and blade can move and be more forgiving when the user shaves over different surfaces.

Figure 36:
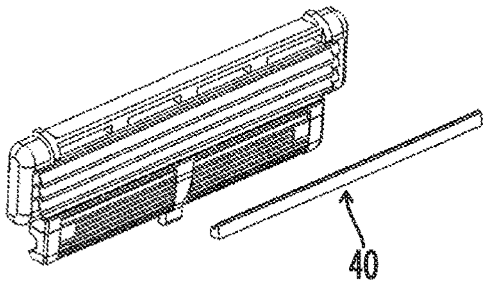
FIG. 36 shows a two-sided floating blade—flexible blade cartridge and shows a lubrication strip area and a lubrication strip.

Another embodiment of the present disclosure is shown in the FIG. 36 shows a two sided floating blade—flexible blade cartridge with lubricating strips 90. The lubricating strips 90 can be located anywhere on the cartridge 40 and be connected to the cartridge 40 by snap fit or any way possible. The lubricating strips 90 can be made with any type of materials, ingredients, vitamins and aloe.

Figure 37:
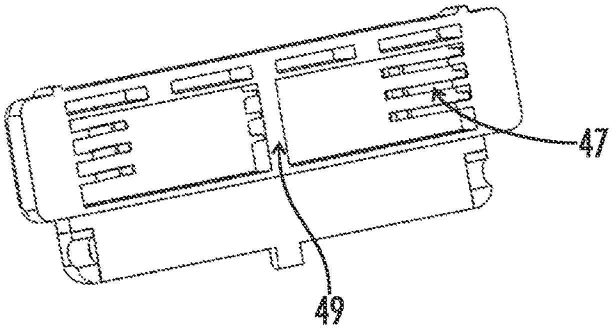
FIG. 37 shows the back-side of a two-sided floating blade—flexible blade cartridge with finger tabs.

Another embodiment of the present disclosure is shown in the FIG. 37 shows the inner backside of a two sided finger tab—floating blade—flexible blade cartridge 40. The finger tabs can be any size, shape, angle and any design. The two sided razor cartridge 40 can have one to any number of finger tabs on each side. The middle blade support can be any size or shape or it can be designed without any blade support. The backside can be smooth or have male or female connection areas or any type of connection areas. The blades and blade carriers are not inserted from this side however the cartridge 40 can be designed so the blade carrier and blades can be inserted from the backside of the cartridge 40 half.

Figure 38:
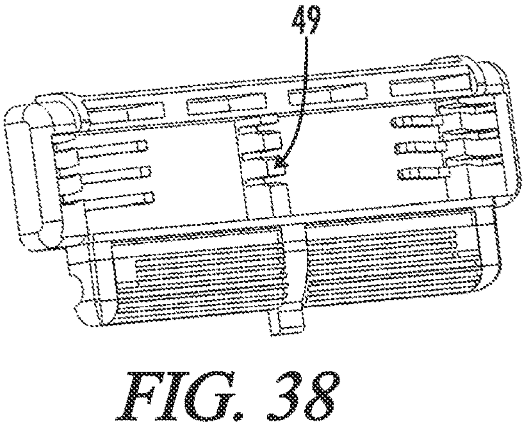
FIG. 38 shows the front-side of a two-sided floating blade—flexible blade cartridge with finger tabs.
Figure 39:
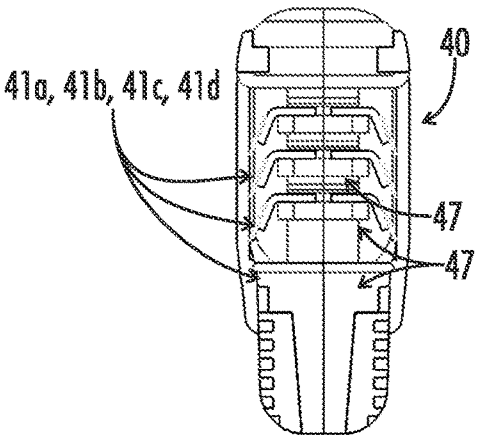
FIG. 39 shows the side view of a two-sided floating blade—flexible blade cartridge with finger tabs.

Another embodiment of the present disclosure is shown in the FIG. 38 shows the outside of a two sided finger tab—floating blade—flexible blade cartridge 40. The guard can be any size or shape and be made of any material or rubber and can be located anywhere. The finger tabs can be any size, shape, angle and any design. The two sided razor cartridge 40 can have one to any number of finger tabs on each side. The middle blade support can be any size or shape or it can be designed without any blade carrier/blade support. The blades and blade carriers are inserted from this side however the cartridge 40 can be designed so the blade carrier and blades can be inserted from the inner side of the cartridge 40 half and there would be no blade support on the front of the cartridge 40 or it can have one. FIG. 39 shows a side view of cartridge 40 32A & 32B with blades on both sides of the cartridge 40. Both sides would have blades as shown in 41*a*,41*b*,41*c*, 41*d* and both sides would have blade fingers 37 on each side of the cartridge 40.

In yet another embodiment as shown in the FIGS. 40-48, is a two-sided floating blade—flexible blade cartridge 40 with plurality of cartridge ribs 49 are provided on the cartridge 40 to facilitate constraining of each of the blades 41*a*,41*b*,41*c*,41*d* in a direction towards the outer side of the cartridge 40. As shown in the FIG. 34, each of the blades 41*a*,41*b*,41*c*,41*d* are fixedly attached to the blade carrier only at the ends instead of being joined along the entire length of the blade carrier 45. This saves material costs as well as offers flexibility as a result of reduced constraints of each of the blades 41*a*,41*b*,41*c*,41*d*. But at the same time, the cartridge ribs 49 allow bending of the blades towards the blade pivot axis 44 of the blades 41*a*,41*b*,41*c*,41*d*. The bending and movement of the blades can be in any direction except towards the outer side of the dual sided razor cartridge 40 face on both sides.

Figure 40:
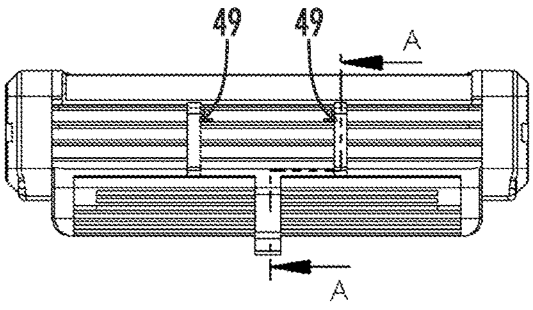
FIGS. 40 and 41 shows another version of two-sided floating blade-flexible blade cartridge.
Figure 41:
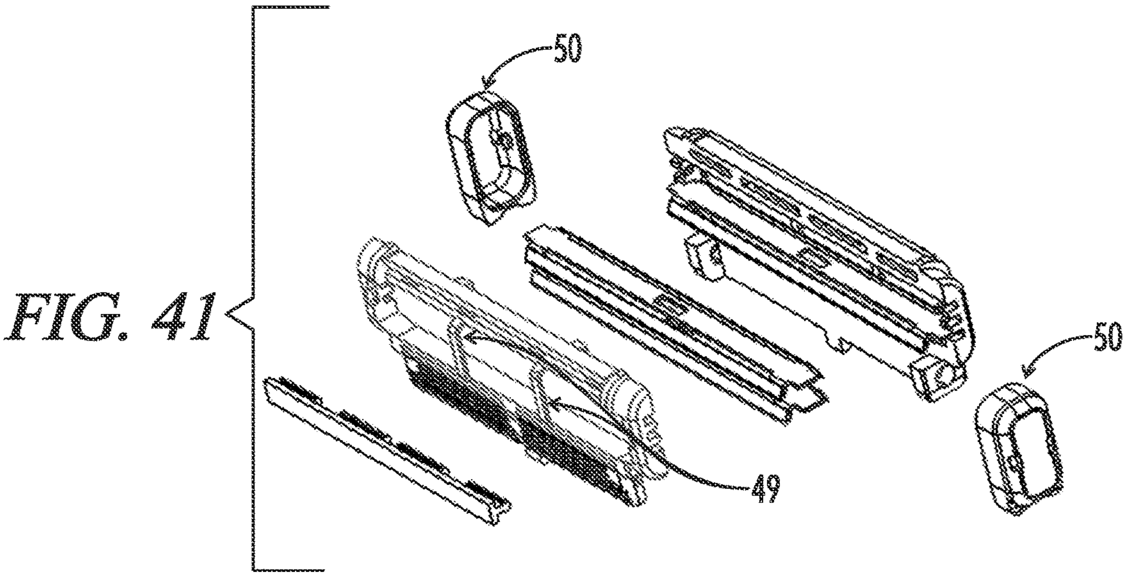
Figure 42:
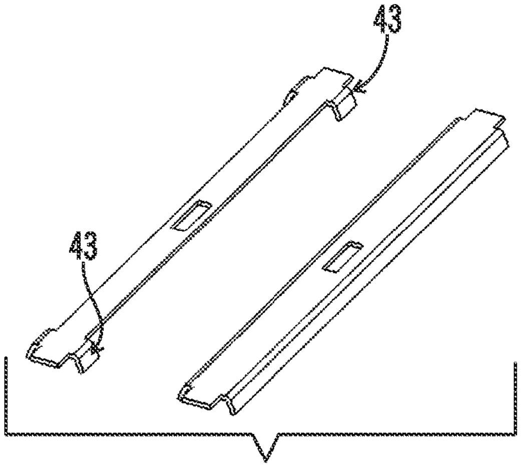
FIG. 42 shows a current blade welded to a blade carrier wand a blade carrier without a welded blade that goes into the two-sided floating blade—flexible blade cartridge shown in FIGS. 41 and 42.
Figure 43:
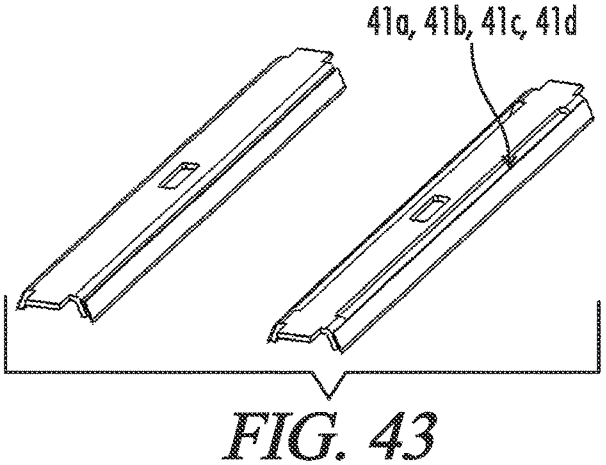
FIG. 43 shows a current blade welded to a blade carrier and a blade welded to a blade carrier that goes into the two-sided floating blade—flexible blade cartridge shown in FIGS. 41 and 42.

FIG. 41 shows an exploded view of cartridge 40 FIG. 40. It shows end caps that enclose the two cartridges halves together. The two cartridge halves can also be attached together by snap fit only, it can be attached by 1 to any number of clips, aluminum clips or any other way known today or developed in the future. FIG. 42 shows a picture of our current blade carrier to the right and the new blade carrier design as shown in cartridge 40 of FIG. 40-41. This new blade carrier design can be any shape, size, thickness and made of any material. The blade carrier 45 can have a hole in the middle or anywhere or have none. The legs or tabs on one each side of the ends can be any shape, design, material and can be located anywhere. There can be any number of these legs or tabs on each side. The blades 41*a*, 41*b*, 41*c*, 41*d* can be laser welded or attached any way that permanently attaches the blade to the blade carrier. Blades 41*a*, 41*b*, 41*c*, 41*d* are shown welded at the ends only with no back support in the middle. They can deflect backwards when required and the forward movement is restricted by two cartridge ribs 49 running across the face of the cartridge 40. FIG. 43 shows a picture of our current blade welded to a blade carrier 45 on the left and to the right the new blade carrier design with a blade welded and or permanently attached. FIG. 46 also shows the new blade carrier with the blade attached. There can be spacing between the two pieces to allow for good rinsibility between the two sides and between each level of blades 41*a*, 41*b*, 41*c*, 41*d* within the cartridge 40.

Figure 44A:
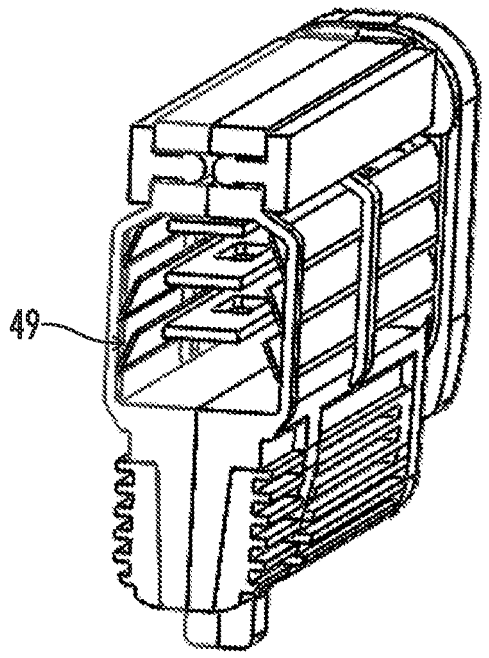
FIGS. 44A, B, and C show a side cross section view of a two-sided floating blade—flexible blade cartridge with cartridge ribs covering the blades shown in FIGS. 40 and 41.
Figure 44B:
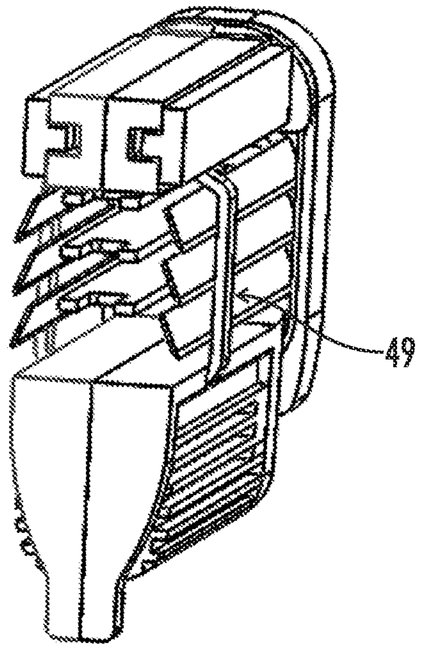
Figure 44C:
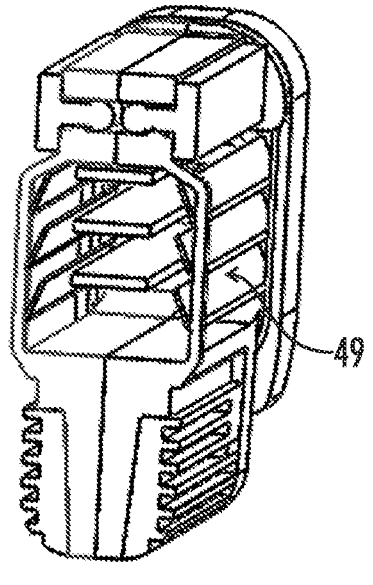

FIGS. 44A-44C show three different section views of finger tab-floating blade—flexible blade cartridge 40 with cartridge ribs 49 that are in front of the blades 41*a*, 41*b*, 41*c*, 41*d* and part of the cartridge 40 face of each side. The cartridge ribs 49 allow the blade to move backward and prevent the blades 41*a*, 41*b*, 41*c*, 41*d* from going outward towards the user's skin. The cartridge ribs 49 on each side of the face of the cartridge 40 can be located anywhere, there can be one to any number of cartridge ribs 49, be any shape size design or made of any material. This razor cartridge 40 design can be designed any way possible to accomplish the same effect.

Figure 45:
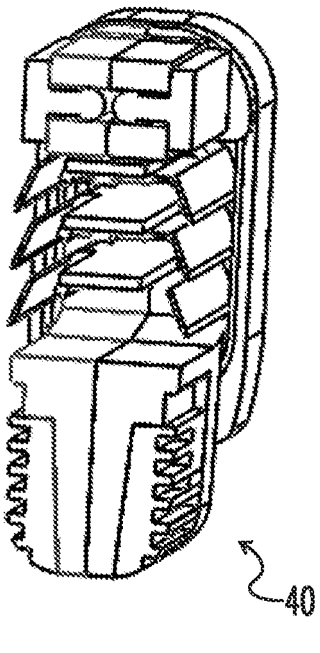
FIG. 45 show a side cross section view of a two-sided floating blade-flexible blade cartridge with no cartridge ribs covering the blades shown in FIGS. 40 and 41.

In yet another embodiment as shown in the FIG. 45, shows a cross section view and this is just like the same cartridge 40 shown in FIGS. 40-44C but with no cartridge ribs 49 over the blades 41*a*, 41*b*, 41*c*, 41*d* on each side of the face of the cartridge 40. In yet another embodiment as shown in the FIG. 47 shows two cartridge halves of a two-sided floating blade—flexible blade cartridge with plurality of cartridge ribs 49. There are two cartridge ribs 49 shown on each side and there can be any number of cartridge ribs 49 and be located anywhere. This design and shape of this cartridge 40 can be any design and shape, any be assembled in one to any number of parts and can be attached any way possible to accomplish the same effect. FIG. 48, shows a cross section view and this is just like the same cartridge 40 shown in FIGS. 40-44C showing a cartridge rib over the blades 41*a*, 41*b*, 41*c*, 41*d* on each side of the face of the cartridge 40.

In yet another embodiment as shown in the FIGS. 49-53, is a two-sided floating blade—flexible blade cartridge 40. In another embodiment as shown in the FIGS. 50-53 have blade tabs 43 are provided on each of the sides of the blade carrier 45. The blade tabs 43 facilitate restriction of the blades 41*a*,41*b*,41*c*,41*d* in a direction toward the outer side of the dual sided razor 100. But at the same time, the blade tabs 43 allow bending or moving of the blades 41*a*, 41*b*, 41*c*, 41*d* towards the blade pivot axis 44 of the blades 41*a*,41*b*, 41*c*,41*d*. Blades 41*a*, 41*b*, 41*c*, 41*d* are shown welded at the ends only with blade back support in the middle. The blades can deflect backwards when required and the forward movement is restricted by two tabs coming from the blade support on each side.

The bending and movement of the blades 41*a*, 41*b*, 41*c*, 41*d* can be backwards or it can move any direction except towards the outer side of the dual sided razor face of the cartridge 40. FIG. 50 shows an exploded view of the cartridge 40 as shown in FIGS. 49-53. There can be any number of cartridge parts, any design, any way to assemble for all cartridges described in this application.

Figure 52:
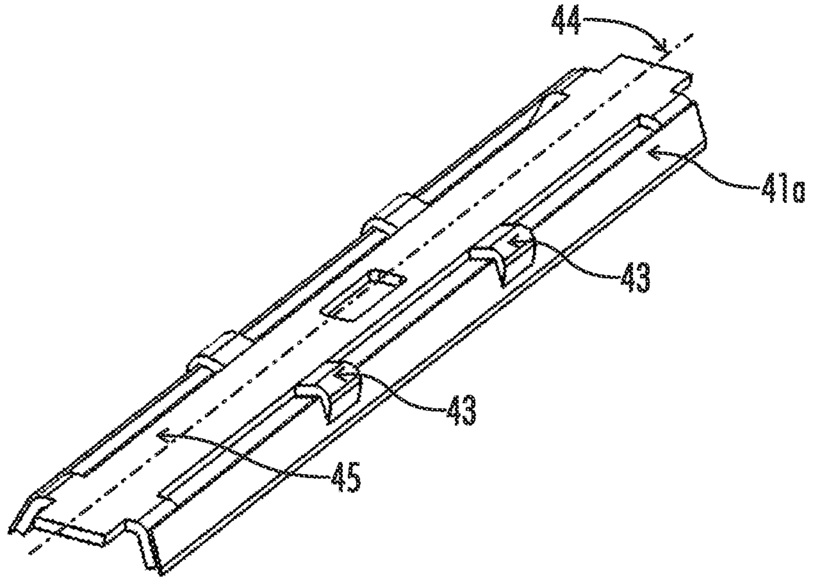
FIG. 52 shows a blade carrier with and a blade welded to a blade carrier that goes into the two-sided floating blade—flexible blade cartridge shown in FIGS. 49 and 50.
Figure 53:
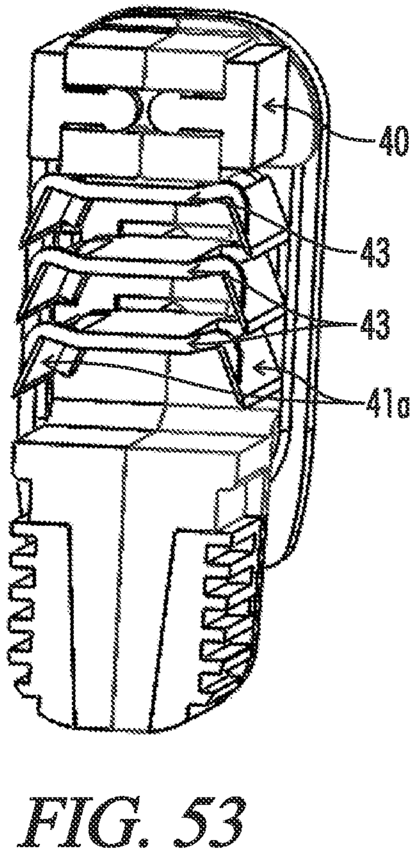
FIG. 53 show a detailed side cross section view of a two-sided floating blade—flexible blade cartridge shown in FIGS. 49 and 50.

FIG. 51 shows a picture of a new blade carrier design as shown in cartridge 40 of FIGS. 49-53. This news blade carrier design can be any shape, size, thickness and made of any material. The blade carrier can have a hole in the middle or anywhere or have none. The legs or tabs on one each side of the ends can be any shape, design, material and can be located anywhere. There can be any number of these legs or tabs on each side. The blades 41*a*, 41*b*, 41*c*, 41*d* can be laser welded or attached any way that permanently attaches the blade to the blade carrier. FIG. 52 shows a picture of our current blade welded to a blade carrier 45 on the left and to the right the new blade carrier design with a blade welded and or permanently attached. FIG. 46 also shows the new blade carrier 45 with the blade attached. There can be spacing between the two pieces at the top section to allow for good rinsibility between the two sides and between each level of blades 41*a*, 41*b*, 41*c*, 41*d* within the cartridge 40. FIG. 53, shows a cross section view of the cartridge 40 shown in FIGS. 49-53 showing the cartridge tabs 43.

In another embodiment as shown in the FIGS. 54-61, leaf springs 70 are provided between the blades 41*a*,41*b*,41*c*, 41*d*. The blades 41*a*,41*b*,41*c*,41*d* are split along the blade pivot axis 44 as shown which facilitates an extra degree of freedom. The leaf springs 70 facilitate restriction of the blades 41*a*,41*b*,41*c*,41*d* in a direction toward the outer side of the dual sided razor 100. But at the same time, the leaf springs 70 allow bending of the blades towards the blade pivot axis 44 of the blades 41*a*,41*b*,41*c*,41*d*. The bending and movement of the blades 41*a*, 41*b*, 41*c*, 41*d* can also be any direction except towards the outer side of the dual sided razor face of the cartridge 40. Thus, shaving performance is enhanced, as irregular shaving surfaces are shaved accurately and satisfactorily with any of the floating blade or flexible blade cartridges described in this application. FIG. 55 shows an exploded view of the cartridge as shown in FIGS. 54-61. FIG. 56 and FIG. 59A shows a bottom view of each side of the blade and blade carrier connected together by leaf spring 70. FIG. 59B shows a side view of each side of the blade and blade carrier connected together by leaf spring 70. The gap between the blade and blade carrier allow for the leaf spring 70 let the blade carrier flex and move up, down or it can be in any direction for a close and comfortable shave and the space allows for good rinsibilty. The leaf spring 70 can be any size, any shape, any design, any material, any number and be connected any way possible to each side of the blade carrier/blade. The shape of the blade carrier can be any size or shape.

Figure 58:
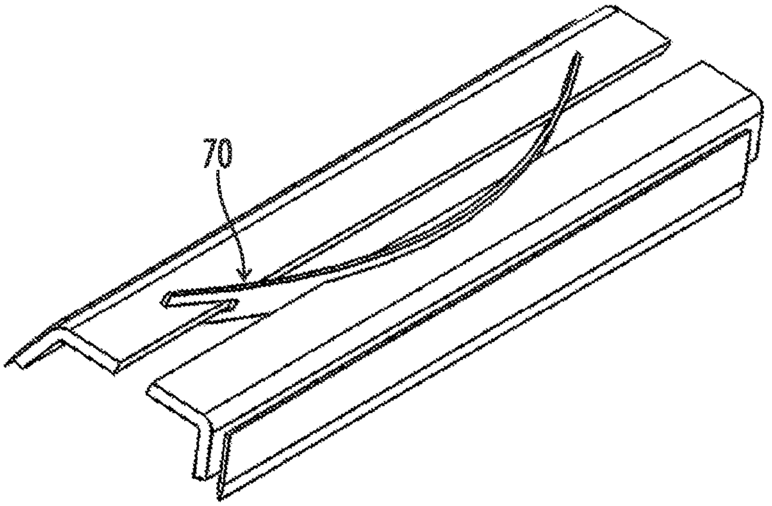
FIG. 58 shows a top view of flexible/leaf springs that are connected to each side of the blade & blade carrier.
Figure 59A:
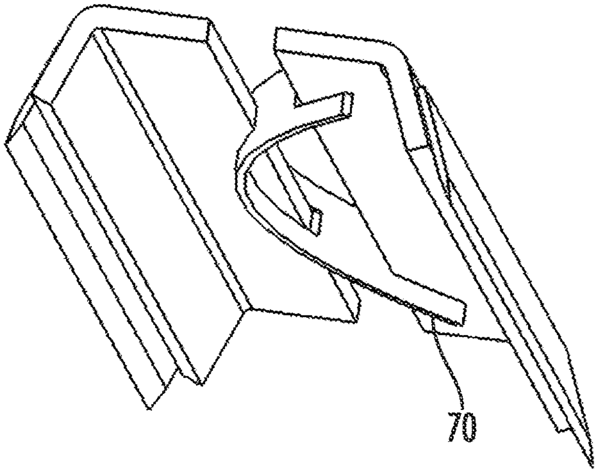
FIG. 59A shows a bottom view of flexible/leaf springs that are connected to each side of the blade & blade carrier.
Figure 59B:
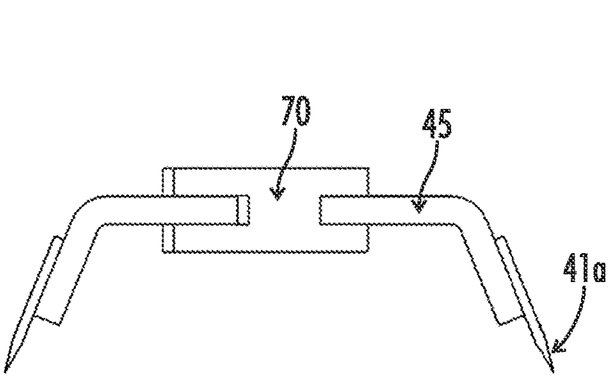
FIG. 59B shows a side view of flexible/leaf springs that are connected to each side of the blade & blade carrier.
Figure 60A:
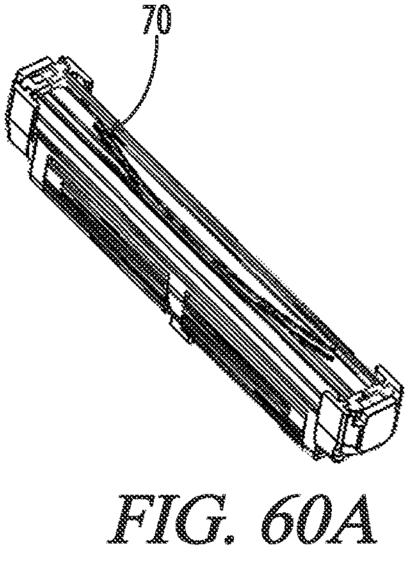
FIGS. 60A and 60B show a top cross section view of a two-sided floating blade—flexible blade cartridge as shown in FIGS. 54 and 55.
Figure 60B:
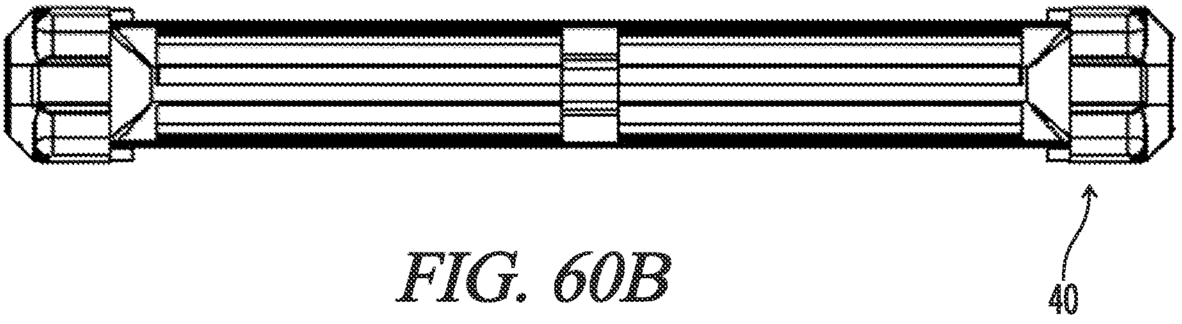
Figure 61:
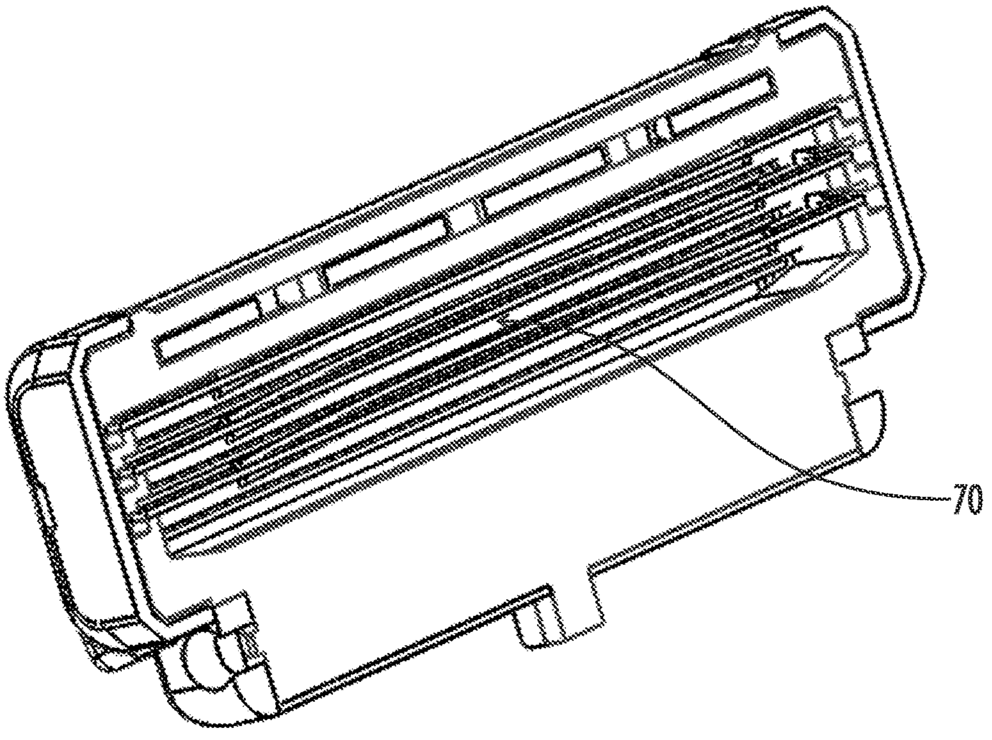
FIG. 61 show the back half side of a two-sided floating blade—flexible blade cartridge as shown in FIGS. 54 and 55.

FIG. 57, shows a cross section view of the cartridge shown in FIGS. 54-61 showing the leaf springs 70. FIG. 58 shows a top view of each side of the blade and blade carrier connected together by leaf spring 70. FIG. 59A shows a bottom section view of the cartridge shown in FIGS. 54-61 and the leaf spring 70. FIG. 59B shows a side view of the cartridge shown in FIGS. 54-61 and the leaf spring 70. FIGS. 60A and 60B shows a top section view of the cartridge 40 shown in FIGS. 54-61 and the leaf spring 70. FIG. 61 shows backside of half of the cartridge shown in FIGS. 54-61 and the leaf spring 70. The top of the cartridge 40 shown in this application can have a trim blade at the very top portion of the two-sided razor cartridge.

Figure 62:
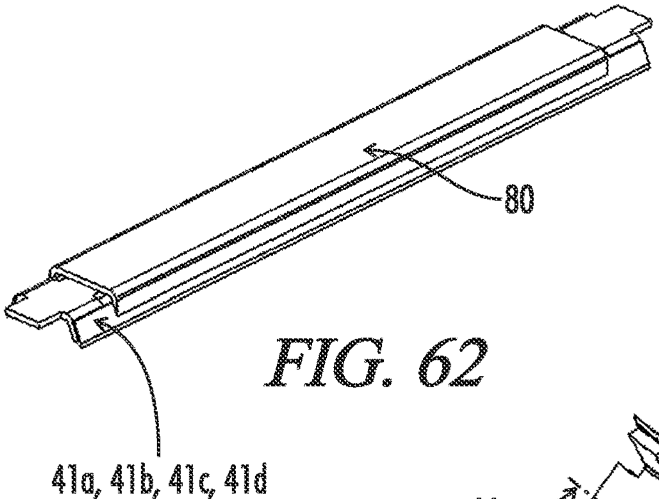
FIG. 62-68 shows another version of a two sided floating blade—flexible blade cartridge.
Figure 63:
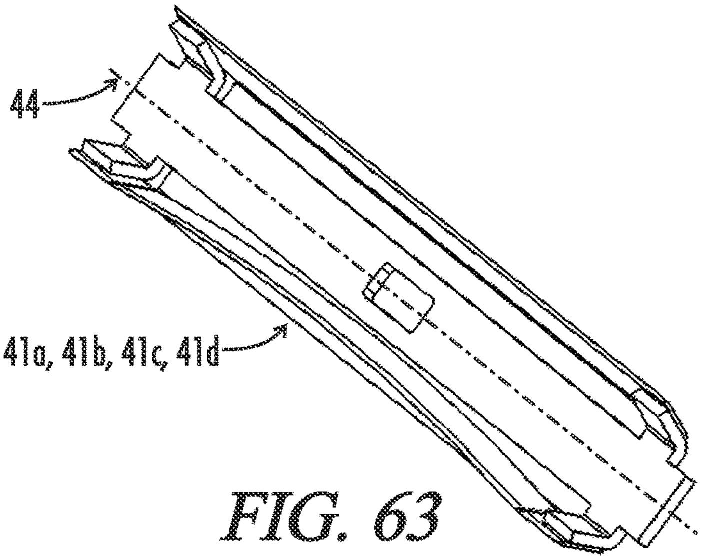

Another embodiment of the present disclosure is shown in the FIGS. 62-68, wherein metal channels 80 are provided on top of each of the blades 41*a*,41*b*,41*c*,41*d*. to facilitate constraining of the blades 41*a*,41*b*,41*c*,41*d*. This arrangement allows for flexing of each of the blades 41*a*,41*b*,41*c*, 41*d* towards inward while restricting the bending of the blades 41*a*,41*b*,41*c*,41*d* in the outward direction. Thus, shaving performance is enhanced, as irregular shaving surfaces are shaved accurately and satisfactorily. FIG. 62 shows a blade carrier with a blade welded permanently attached and metal channel 80 allows for flexing of each of the blades 41*a*,41*b*,41*c*,41*d* towards inward while restricting the bending of the blades 41*a*,41*b*,41*c*,41*d* in the outward direction. FIG. 63 shows the back view or underside view of the blade carrier 45 in FIG. 65. FIG. 63 further shows flexing of each of the blades 41*a*,41*b*,41*c*,41*d* towards inward pivot 44 axis. The movement of the blade 41*a*,41*b*,41*c*,41*d* can be backwards or it can be in any direction, any angle but not in an outward direction towards the outside face of each cartridge side or towards the user skin or shaving surface.

Figure 64:
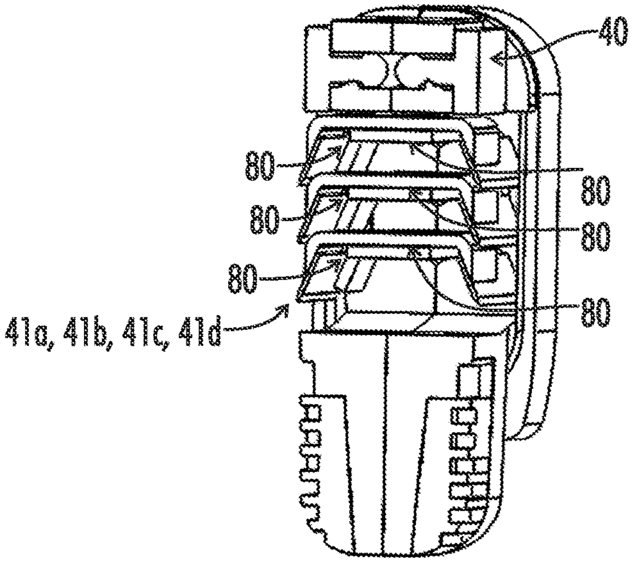
Figure 65:
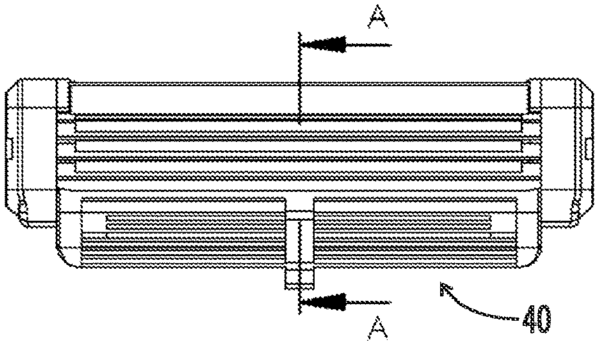
Figure 66:
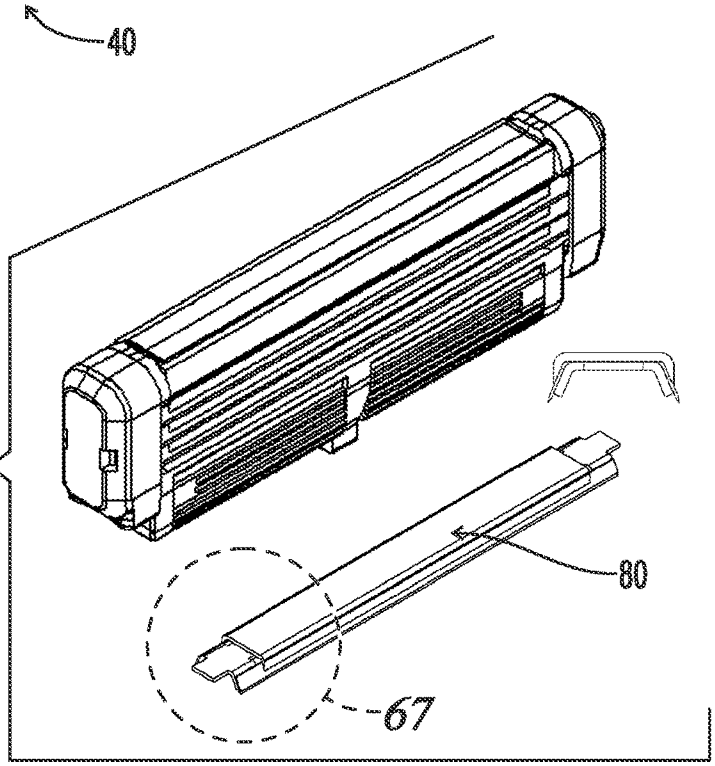
Figure 67:
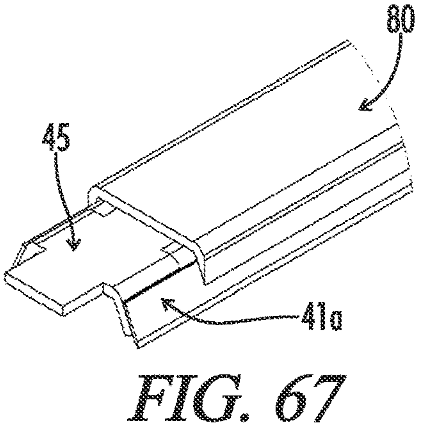
Figure 68:
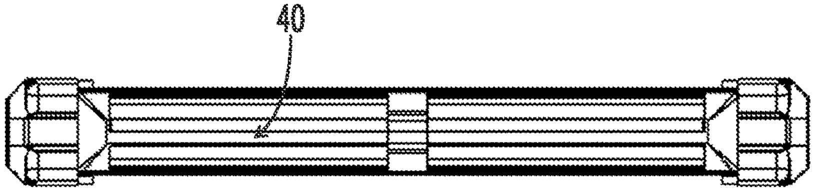

The metal channel 80 can be any shape, any size, any design, any material, any number, any attachment. The metal channel has holes on the top and bottom side to allow for good rinsability. FIG. 64, shows a cross section view of a cartridge with the blade carrier and metal channel 80. The metal channel is on both sides of the two-sided razor cartridge 40. FIG. 65 shows one side of a two-sided floating blade—flexible blade cartridge 40. FIG. 66 shows a two-sided floating blade—flexible blade cartridge 40 and a blade attached to a blade carrier 45 with the metal channel 80 attached. FIG. 67 shows an enhanced view on an end of a blade 41*a* attached to a blade carrier 45 with the metal channel 80 attached. FIG. 68 shows a top section view of the cartridge 40 shown in FIG. 65.

Figure 69:
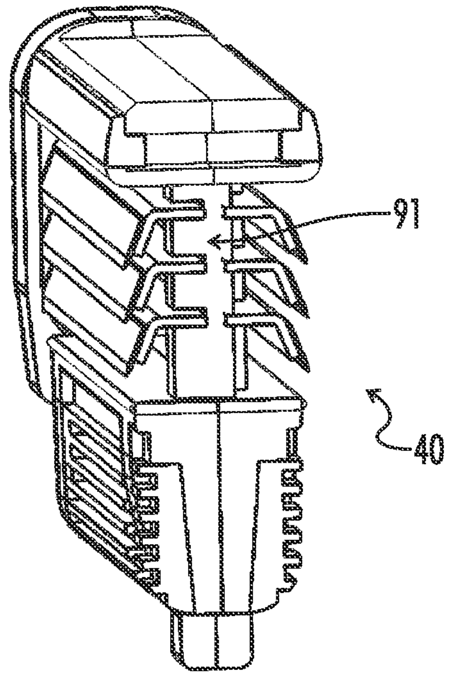
FIG. 69-71 shows a center blade supports staggered and telescoped to reduce thickness.
Figure 70:
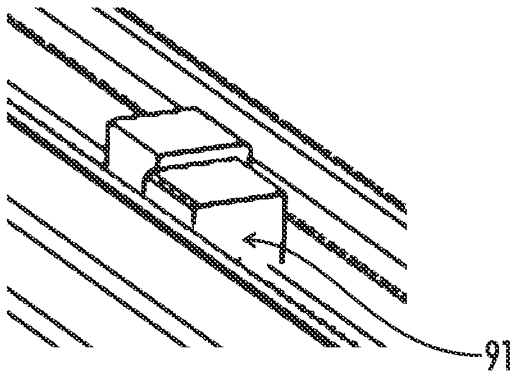
Figure 71:
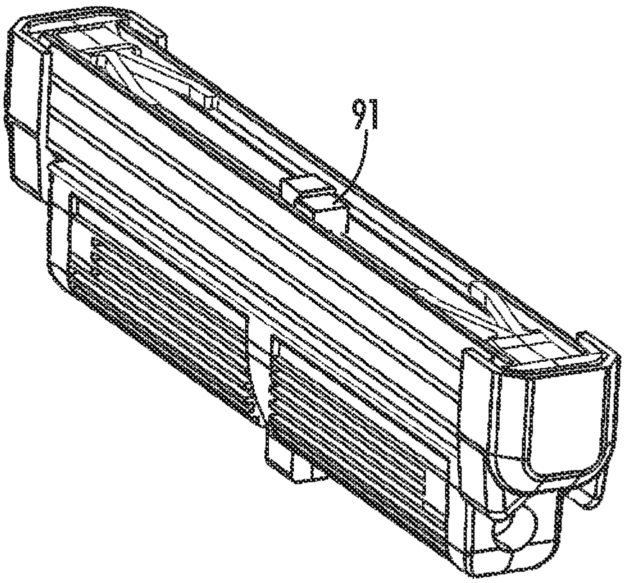

In yet another embodiment as shown in the FIGS. 69-71 shows a center blade support 91 staggered and telescoped to reduce thickness of the overall two-sided floating/flexible blade razor cartridge 40. FIG. 65 shows a cross section view showing the center blade support 91. FIG. 66 shows an enhanced view of the staggered and telescoping blade support 91 to reduce the overall razor cartridge thickness. FIG. 67 shows a top cross section view of the staggered and telescoping blade support 91 to reduce the overall razor cartridge thickness. The staggered and telescoping blade support 91 can be any size, shape, any design, any number, any location and any material. The staggered and telescoping blade support 91 helps supports the blade span normally in the middle of the cartridge 40 or at a suitable location on the blade 41*a*. This also helps prevent the blade 41 from bowing and moving in the wrong direction.

The new dual sided system razor and disposable razor described in this application shows many dual sided razor improvements. The dual sided razor new improvements allow the consumers to have many benefits, as is disclosed throughout this application.

One of the most important feature is the consumers can get twice the life out of their disposable razor and system razor which is never been offered before until now. Consumers would benefit from having two shaving cycles or uses every time they buy this new dual sided disposable razor and system razor. The consumer will also have two sets of fresh blades to use every time they use and buy disposable razors and system razor cartridges. This creates a better value proposition for the consumer when they get twice the life out of every disposable razor and system razor cartridges instead having only 1 shaving use.

There are many other important features mentioned which it will make switching from the 1st shaving side to the 2nd shaving side much faster and easier. This allows it to be more convenient for consumers to use every day.

In today's razor market, consumers are faced to pay high prices for razors and even higher prices for the replacement cartridges that are sold. This dual sided razor innovation allows consumers to save money by having twice the shave as normal razors and cartridges. This way they can spend less money a year on razors and this is one reason why this invention is much needed in the marketplace. The present invention and application enclosed herein has a new and better way to bring consumers a dual sided razor with a great shave and save them money.

The dual sided razor is a concept that allows consumers to save money and have shaves that last twice as long. Typical razors have 1-5 blades only on one side and when they get dull they through them away. With the dual sided razor, there are 1-5 blades and on each end of the blade there's a sharp edge for shaving. So both ends of the razor blade is sharp and has 2 sided shaving surfaces. This way the consumer can use one side of the razor and then use the other side of the razor cartridge and shave twice as long. The razor blades will be utilizing both ends of the razor blade instead of wasting the other end opposite of the normally sharp end.

The new dual sided system razor and disposable razor described in this application shows many dual sided razor improvements. The dual sided razor new improvements allow the consumers to have many benefits, as disclosed throughout this application.

One of the most important feature is the consumers can get twice the life out of their disposable razor and system razor which is never been offered before until now. Consumers would benefit from having two shaving cycles or uses every time they buy this new dual sided disposable razor and system razor. The consumer will also have two sets of fresh blades to use every time they use and buy disposable razors and system razor cartridges. This creates a better value proposition for the consumer when they get twice the life out of every disposable razor and system razor cartridges instead having only 1 shaving use.

There are many other important features mentioned which it will make switching from the 1st shaving side to the 2nd shaving side much faster and easier. This allows it to be more convenient for consumers to sue everyday.

In today's razor market, consumers are faced to pay high prices for razors and even higher prices for the replacement cartridges that are sold. This dual sided razor innovation allows consumers to save money by having twice the shave as normal razors and cartridges. This way they can spend less money a year on razors and this is one reason why this invention is much needed in the marketplace. The present invention and application enclosed herein has a new and better way to bring consumers a dual sided razor with a great shave and save them money.

The dual sided razor is a concept that allows consumers to save money and have shaves that last twice as long. Typical razors have 1-5 blades only on one side and when they get dull they through them away. With the dual sided razor, there's 1-5 blades and on each end of the blade there's a sharp edge for shaving. So both ends of the razor blade is sharp and has 2 sided shaving surfaces. This way the consumer can use one side of the razor and then use the other side of the razor cartridge and shave twice as long. The razor blades will be utilizing both ends of the razor blade instead of wasting the other end opposite of the normally sharp end.

1) New Faster & Easier Dual Sided Disposable Razor

When consumer buy a typical disposable razor they use it until the blades are dull, then the consumer throws it away. The new disposable razor has improvements to allow the consumer to use the 1st side of the razor and when dull switch to the second side faster and easier. This makes using this dual sided disposable razor more convenient for consumers and to allow them to have 2 sides of fresh blades every time they buy and use a disposable razor. To offer twice the shave with every disposable razor they buy is a huge value proposition for the consumer. Consumers always love a new set of blades and when they buy this dual sided disposable razor it allows consumers to have 2 sets of fresh blades to use during each use. There's 1 disposable razor but it offers many benefits like twice the shave and the opportunity to use 2 sets of blades during the entire life of using a disposable razor. The disposable razor handles currently used in the market, the handles are used one time, and so this dual sided disposable razor allows consumers to use the handle twice. It allows for a longer life handles and less thrown away prematurely. The most important feature is the consumers can get twice the life out of their disposable razor which is never been offered before until now. Consumers would benefit from having two shaving cycles or uses every time they buy this new dual sided disposable razor. The consumer will also have two sets of fresh blades to use every time they use and buy disposable razor cartridges. This creates a better value proposition for the consumer when they get twice the life out of every disposable razors instead having only 1 shaving use.

Handle

The dual sided disposable razor handle is symmetric handles that can be held have two separate uses on both sides. Old safety razors usually have a round handle that can be held on both sides while shaving, however this new handle is used differently which is disclosed. Old safety razors have 2 edges where the user shaves back and forth across their skin while shaving. Both edges are used at the same time until the blades are dull and the double edge razorblade needs to be replaced. This new symmetric handle is used differently than old safety razors; the user would hold a razor handle (1st handle side) that is comfortable to grasp and hold while shaving with the 1st shaving side. When the user is done using the 1st side and the blades are dull, then the user would flip the cartridge to the 2nd shaving side and the user would turn and rotate the handle to the second handle side which is opposite the 1st handle side and continue to shave. The 2nd side of handle is usually an identical and mirror image of the 1st handle side and is comfortable to grasp and hold and to shave with. After the 2nd side is dull the user would throw away this dual sided disposable razor and buy another dual sided disposable razor and repeat these steps. No other razor handle in the market works this way.

The handle can be ergonomically shaped on both sides so it's very comfortable to hold the razor handle on both sides. There can be finger grooves or areas that are inset or raised that can allow the finger to rest comfortable and easily and allow the consumers to hold the handle comfortable and shave conveniently with a convenient and comfortable feel while holding the razor on both the 1st handle side and the 2nd handle side.

The dual sided disposable razor handle can be any shape, size, design know now or developed in the future. The dual sided disposable razor handle can be made of steel, plastic, rubber or any material or combination of materials. The handle can be solid, hollow and bored out from the bottom of the handle. One side can be solid and the side has hollow areas. The dual sided disposable razor handle can be made of any material or combination of materials. It can be made of steel, or any heavy material, plastic, rubber, or any soft type of materials and any combination of materials and can be made of any type of materials. The handle can be one to any number of pieces.

The top of the handles can have any type of connectors or any kind of attachment mechanisms to connect to a dual sides razor head that's known now or developed in the future. The handle & dual sided razor head can be one piece or several pieces or can all molded together. These areas can have hinge areas to allow the cartridge to flex back and forth while shaving.

Attachment

The dual sided disposable razor cartridge can be attached to any kind of razor handle know now or developed in the future. The dual sided cartridge that has parallel shaving surfaces and the cartridge can have any type of attachment or connection. It can be made of plastic rubber, steel or any type of material known now or developed in the future. The attachment can be like any razor attachment in the market known now or brought to market in the future. The attachment can be permanent or removable. The attachment could have no attachment and be molded as part of the handle. The dual sided disposable razor cartridge can be attached directly to the handle or to handle, swivel arms, arms or prongs or any part of the razor, handle or cartridge or any part of the razor. The dual sided disposable razor cartridge can be molded into the handle and part of the handle or the razor and be one unit or separate pieces or units.

2) New Faster & Easier Dual Sided System Razor & New Handles

This new faster and easier dual sided system razor works similar to the dual sided disposable razor except the cartridge is replaceable when both sides have been used and are dull, then a new cartridge can be replaced and put on the handle.

When consumer buy a typical system razor they use the razor cartridge until the blades are dull, then the consumer throws it away and puts another cartridge on the handle. The new system razor has improvements to allow the consumer to use the 1st side of the razor and when dull switch to the second side faster and easier. This makes using this dual sided system razor more convenient for consumers and to allow them to have 2 sides of fresh blades every time they buy and use system razor cartridges. To offer twice the shave with every system razor they buy is a huge value proposition for the consumer. Consumers always love a new set of blades and when they buy this dual sided system razor it allows consumers to have 2 sets of fresh blades to use during each use of every razor cartridge. The new system razor offers many benefits like twice the shave and the opportunity to use 2 sets of blades during the entire life of using every razor cartridge.

The method of using this faster and easier dual sided system razor;

The user would use the cartridge currently on the razor cartridge and when the 1st sides of the dual sided razor cartridge is dull, then the user would flip the cartridge back over to the other side. This means when the 1st side is being used the top part of the cartridge is angled back towards the back of 2nd sides of the cartridge and the 2nd handle side. When the 1st side if the razor cartridge is dull, then the user would toggle and flip the top of the razor cartridge opposite direction so now the top parts of the cartridge is angled toward the 1st side of the cartridge and the 1st handle side.

When the system razor flips to the other side the cartridge goes over a built-in deflector on the top of the swivel arm cartridge or handle. When the consumer uses the 2nd side completely and the blades are dull then the consumer can disconnect the cartridge by pulling the cartridge away from the handle or by a button and throw away. Then the consumer would put another new dual sided razor cartridge on the new system razor and continue using like described above, it can be used any way possible not just what is explained above.

The process of flipping the cartridge from the 1st side to the 2nd side can be done any way possible known now or developed or learned in the future. One way to flip from one side to other . . . the consumer can switch sides and move by using their fingers. Or they can turn the razor upside down and using the counter top and touch the top section to the counter top or flat surface and push the top of the razor cartridge until flips to the other side, this is a real fast and easy way without using your fingers.

Handle

The dual sided system razor handle is symmetric handles that can be held have two separate uses on both sides. Old safety razors usually have a round handle that can be held on both sides while shaving, however this new handle is used differently which is disclosed. Old safety razors have 2 edges where the user shaves back and forth across their skin while shaving. Both edges are used at the same time until the blades are dull and the double edge razorblade needs to be replaced. This new symmetric handle is used differently than old safety razors; the user would hold a razor handle (1st handle side) that is comfortable to grasp and hold while shaving with the 1st shaving side. When the user is done using the 1st side and the blades are dull, then the user would flip the cartridge to the 2nd shaving side and the user would turn and rotate the handle to the second handle side which is opposite the 1st handle side and continue to shave. The 2nd side of handle is usually an identical and mirror image of the 1st handle side and is comfortable to grasp and hold and to shave with. After the 2nd side is dull the user would throw away the dual sided razor cartridge and replace with another two sided razor cartridge and repeat these steps mentioned. No other razor handle in the market works this way.

The handle can be ergonomically shaped on both sides so it's very comfortable to hold the razor handle on both sides. There can be finger grooves or areas that are inset or raised that can allow the finger to rest comfortable and easily and allow the consumers to hold the handle comfortable and shave conveniently with a convenient and comfortable feel while holding the razor on both the 1st handle side and the 2nd handle side.

The dual sided system razor handle can be any shape, size, design know now or developed in the future. The dual sided system razor handle can be made of steel, plastic, rubber or any material or combination of materials. The handle can be solid, hollow and bored out from the bottom of the handle. One side can be solid and the side has hollow areas. The dual sided system razor handle can be made of any material or combination of materials. It can be made of steel, or any heavy material, plastic, rubber, or any soft type of materials and any combination of materials and can be made of any type of materials. The handle can be one to any number of pieces.

The top of the handles can have any type of connectors or any kind of attachment mechanisms to connect to a dual sides razor head that's known now or developed in the future. The handle & dual sided razor head can be one piece or several pieces or can all molded together. These areas can have hinge areas to allow the cartridge to flex back and forth while shaving The dual sided system razor cartridge can be attached to any kind of razor handle know now or developed in the future. The dual sided cartridge that has parallel shaving surfaces and the cartridge can have any type of attachment or connection. It can be made of plastic rubber, steel or any type of material known now or developed in the future. The attachment can be like any razor attachment in the market known now or brought to market in the future. The attachment can be permanent or removable. The attachment could have no attachment and be molded as part of the handle. The dual sided system razor cartridge can be attached directly to the handle or to handle, swivel arms, arms or prongs or any part of the razor, handle or cartridge or any part of the razor. The dual sided system razor cartridge can be molded into the handle and part of the handle or the razor and be one unit or separate pieces or units.

13) Flex Blades—Floating Blades-Moving Blades: The two sided razor cartridge can have flexible blades, floating blades or moving blades on one side and or both sides of the two-sided razor cartridge. I will use the term Flex blades to mean Flex blades, floating blades or moving blades. The flex blades allow the razor blades to flex or move according to the contour of the user's skin or the surfaces it shaves over. The flex blades move within the cartridge and any portion of the razor blade that is exposed from the razor cartridge. The flex blades make the shave more comfortable and the flex blades allow the blades to cut the hair as the cartridge and flexible blades go over the user's skin.

With Razor cartridges that don't have flexible blades, floating blades or moving blades, the blades are in a fixed position and they do not move, so when these type of razor cartridges and razors shave over the user skin the razor blades do not move. When the razor cartridge glides over a user's skin in different contours, the blades are fixed and there's no leeway or give.

The advantage of a two sided razor having flexible blades is the user can use one side of the razor with a comfortable shave that flex blades technology offers and when the blades are dull then switch to the other side and continues shaving. This give the consumer twice the shave, the convenience of having another fresh blades to use and saves them money.

The Flex Blades—Floating Blades—Moving Blades can be designed any way known today. The Flex Blades—Floating Blades—Moving Blades can have one to any number of blades on each side of the cartridge. The Flex Blades—Floating Blades-Moving Blades can be attached to a fixed carrier or flexible carrier or axis or frame and the Flex Blades—Floating Blades—Moving Blades can be all connected or separate pieces. Each of the Flex Blades—Floating Blades—Moving Blades on one side of the razor cartridge can move at the same time or separately. The Flex Blades—Floating Blades—Moving Blades can be connected to the 2nd shaving side and or opposing sides of flexible blades or they can all move together or independently. So when the flexible blades move on one side that's being used to shave with, then the opposite side not be used; the flexible blade can move as well allowing for improved flow through of hair and shave cream, gels etc. The rinse ability of the cartridge is better because of the movement of blades.

The Flex Blades—Floating Blades—Moving Blades on both sides can work in unison or move independently.

The blade carrier or blade frame where the blade is welded or attached to it can be one piece or several pieces and can have a hinge type, flex type or spring type mechanism that allows the blade to flex, and move and it can also move while on the blade carrier or blade frame and this allows the blade to flex in a more controlled way instead of relying on plastic or other components to flex the blade when in a cartridge like typical flex blade, floating blade razor cartridges. The hinge type, flex type or spring type mechanism that allows the blade to flex can be located anywhere on the razor cartridge, blade, blade carrier, blade frame, blade holder.

Typical flex blade razor cartridges have plastic type tabs that the blades rest on and when it goes over different contours or surfaces the blades moves and so does the tabs that the blades rest on; giving it the flexibility to move up and down or any direction. With a two-sided razor cartridge, the Flex Blades—Floating Blades—Moving Blades can rest on flexible and moving surfaces or tabs. These tabs and moving surfaces can be located in the cartridge, blade carrier or blade frame or any location and can hold both sides of the flexible blade, blades and or blade carrier or blade frame or just one side and they can move separately or together with the opposing 2nd shaving side Flex Blades Floating Blades—Moving Blades. These tabs and moving surfaces can be located in the cartridge or any location and can hold both sides of the flexible blade, blades and the flexible blades can move separately or together with the opposing 2nd shaving side Flex Blades—Floating Blades—Moving Blades. These tabs can be on the ends of the cartridge and can be any length and can run under the blade carrier or blade or blade frame or any location The blade carrier of a two-sided razor is typically flat and the angled on both sides where the blade is permanently attached to both sides by welding or other means or it can be one piece.

In one embodiment the blade carrier or blade frame can flex or hinge allowing movement instead of being fixed. This can be done any way known today or developed ion the future. It can also be done be stamping holes in the blade carrier when it's made to allow a hinge effect and allow the middle to move up and down when the user shave over the different shaving surfaces. This will also give more holes in the middle of the razor to allow more improved water flow and rinse ability. The ends of the blade carrier will allow the Flex Blades—Floating Blades—Moving Blades to be fixed in the razor cartridge. The cartridge will also be design to hold these the Flex Blades Floating Blades—Moving Blades so they can move. The design of the cartridge holding the Flex Blades—Floating Blades—Moving Blades can be designed any way possible to accomplish this and allow for precise geometry of the razor cartridge.

The angled surface on the blade carrier where the Flex Blades—Floating Blades—Moving Blades are attached to and where it's connected to the flat horizontal surface can have a flex point or hinge point where it moves and flexes in an upward only movement or downward only movement or movement of upward and downward or any direction. This can be accomplished by any way known now or developed ion the future. One embodiment can have the holes and design holes that allow this joint to flex and spring and move up and down or just one direction. The blade carrier and or blade frame can be any shape size or design and made of any material.

In one embodiment the blades on each side of the two-sided razor can be welded to a flat blade or blade carrier then the middle can be bent allowing the two sides to be angled downward to create the right angle for the two sided razor cartridge. The area being bent can be done by machine, laser welding to heat the surface to allow the material to bend. The bend point or hinge point can have holes to allow the flexibility to bend and allow for more water flow through and better rinse ability. Where the Flex Blades—Floating Blades—Moving Blades are attached to and where it's connected to the flat horizontal surface can have a flex point where it moves and flexes in an upward only movement or downward only movement or movement of upward and downward or any direction.

The Flex Blades—Floating Blades—Moving Blades can be bent blades, meaning a blade that is bent or a blade that is connected to a blade carrier and bent. The two-sided razor can hold these independent bent blades separately on each side or together and the two sided razor cartridge can be designed to hold these blades and allow for blade movement and flexing of blades on each side of the razor cartridge. So for example a 3 blade two-sided razor cartridge having 3 independently flex blade on one side and 3 independent flex blades on the other side.

In one embodiment the blade carrier or blade frame can be flat at the top and angled downward on both sides where the Blades are permanently attached. On the opposite ends of the flat surface a portion can stick out and be shaped any way or size possible. These end points can be placed into the two-sided razor cartridge pockets or swivel pockets or cavities, in a blade frame, blade carrier or any location that will allow the blade to flex, float or move thus allowing the blades to cut the hair over different contour shaving surfaces. These cavities or swivel points can be any size or shape and be designed to allow the cartridge to only swivel within a certain range and angle in each direction or any direction. This way the movements of the blades are calculated and can be within strict tolerances and precise progressive blade exposures on each side of the razor cartridge. The blades on the opposite side can move as well but the opposite side is not being shaved with. When side 1 blade being shaved with is moving upward then the 2nd shaving side opposite of side this blade is moving downward. The movement blades on the 1st shaving side can move the opposite direction the 2nd shaving side or they can move the same or any direction.

The angled surface on the blade carrier where the Flex Blades—Floating Blades—Moving Blades are attached to and where it's connected to the flat horizontal surface can have a flex point where it moves and flexes in an upward only movement or downward only movement or movement of upward and downward. The angles of the blade frame or blade carriers can have a flex point, hinge point and or spring point and it can be located anywhere. The angles of the blade or blade frame or blade carrier can flex or the flat surfaces.

Any of the embodiments disclosed can have the Flex Blades—Floating Blades—Moving Blades that move upward only or downwardly only or it can move up and down or any direction. The Flex Blades—Floating Blades—Moving Blades can move separately and or independently and or simultaneously.

The two-sided razor cartridge holding the Flex Blades—Floating Blades-Moving Blades can be one to any number of pieces, in one embodiment the razor cartridge can be one piece for example and the Flex Blades—Floating Blades—Moving Blades can be placed on both sides of the one-piece cartridge and an aluminum clip can hold the flexible blades in place or any other type of connection or end caps already disclosed in previous applications.

The two-sided cartridge with flexible blades can be any shape size and be made of any material known now or a combination of materials and it could be assembled with one piece or a two-piece cartridge or any number pieces of cartridges. The Flex Blades—Floating Blades—Moving Blades & Blade Carrier and blade frame can be any shape size and be made of any material known now or a combination of materials and it could be assembled with one or any number pieces. The Flex Blades—Floating Blades—Moving Blades can be attached any way to permanently attach the blade to the Blade Carrier and blade frame. Or the blade carrier or frame can be made of the Flex Blades—Floating Blades—Moving Blades, it can be on the same surface. The blade can be the blade carrier or blade frame. The Flex Blades—Floating Blades—Moving Blades can be bent or made into a shape that allows the blade to angle downward like disclosed in this application, so the blade is the blade carrier in one.

There could be a center structure that connects the blade, blade supports/blade frame or blade carriers. This can be part of the frame and can be one to any number of pieces. The blades can be welded to this frame and any location to give precise geometry and progressive geometry. A central access can connect all blade carriers, blades, blade frames individually or all of them. The central axis can be located in the center of Flex Blades—Floating Blades—Moving Blades and blade carriers or blade frame or be locates on the ends and the middle of the Flex Blades—Floating Blades—Moving Blades or any location. The blade central axis can be located anywhere and have one to any number of them. The central axis can have flex, spring or hinge areas and or points that allow all the blades to flex and move.

The blades where this central Access can be located in anywhere on blade supports, or blade frame or even the blades and can run through all the Blades supports, blade carriers or blades or be connected to one or all the Blades supports, blade frame or blades and in between all the blade supports there can be breaking points, hinge points flex points or spring points which allows the blade to flex or move inward or outward or up and down or any direction each time the blade is cutting through hair and going over different shaving surfaces or contours. This access can be connected and be located anywhere on the flexible Blades or the blade carrier or any part of the blade connection areas or anywhere within the cartridge to where it can allow the blades to flex. The central axis can have areas on it where they have guides where the blade carrier and blade can move back and forth and in a precise and controlled way The blades on a two sided razor cartridge could be welded to a frame and this frame could hold one to any number of blades and this frame can be independent or connected to the other side of second side of the cartridge blade frame and blades. When the Blades are welded to the frame the frame would have areas where the blade could be angled or welded to a portion that's already angled and the sections are attached to the frame and can move upward or downward and could possibly move in and out so the Blades can flex and move while the user shaves over the different services. Then this frame can be inserted into one side of the cartridge and the same thing with the other side of the cartridge and then assembled. Like described the frame can include both sides of the blades, blade carrier or frame in one or any number of pieces and then place into the razor cartridge to be assembled.

The blade carrier that is currently used in the market has flat at the top and angled on both sides where the blade is permanently attached. In one embodiment in the middle of the section there can be areas split to where the blade can flex or move. This area can be designed to have protrusions or holes or designed to be made into hinge and flex in the middle or any location.

The blade carrier and frame can use a double edge blade and be bent to make the blade be angled on both sides of the blade so it's one piece that has a blade carrier or frame and the blade and no welding required. The blade is the blade carrier.

The blade carrier or blade frame of a two-sided razor is typically flat and the angled on both sides but can be any shape size or design. If it was flat and in order to have precise razor geometry and progressive geometry, the blade carrier or frame that cuts the hair first is lowest blade on the razor cartridge and this blade would not be exposed as much as the next blade above it and the blade after that. So the 1st blade carrier or blade frame flat section can be shorter so it allows the blade welded on both sides not to be exposed as much on both sides. The 2nd flat area of the blade carrier or frame can be slightly longer than the 1st flat portion of the blade carrier or frame, this allows the blade welded to it or attached to it on both sides are to be exposed a little further than blade 1 on both sides that below it. Then the 3rd flat area of the blade carrier or frame is a little longer than 2nd and 1st and the blade on both sides is exposed more than the 2 blades and 1 blades below the 3rd flat area, this way the blades have progressive geometry and can cut progressively. The 1st blade cuts the hair and the 2nd blade passes and cut more of the hair and the 3rd blade cuts the remainder of the hair.

This progressive geometry and blade exposed with progressive geometry can be done with any means possible and any way that has been disclosed in this application.

In one embodiment, when the Flex Blades—Floating Blades—Moving Blades including the blade carrier or blade frame are stacked above each other in a razor cartridge, each stack can have a flex mechanism located anywhere on the blade carrier, blade frame, flex blade, main frame holding the blade, carrier or blade, blade ends or each end or middle or any location. Each stack of the Flex Blades—Floating Blades-Moving Blades and the blade carrier or blade frame can have a flex mechanism in between each stack and the lowest flex blade and or carrier section can have a mechanism that is below to touch another part of the frame or cartridge since there' no blade below it. This flex, spring or hinge mechanism can be located anywhere on the razor cartridge, blade or frame or carrier. This flex mechanism can be made or any material and work any way possible to allow each blade to flex and move up and down or any direction so the blades glide over the different contours and surfaces of the user's skin. These flex points or areas can allow 1st shaving side of the blade to move and the opposite side of the 1st side (the 2nd shaving side) to move in the same direction or opposing direction or any direction.

The flex, floating and moving blade can move any direction. So while the user is shaving, the flex, floating and moving blade can move and allow the shave cream, shave gel or shave butter and hair being cut to move because the flexible blade on both sides are moving allowing a flow through to be constantly moving all the way to the 2nd side not being used and exiting the razor cartridge.

This same when the user rinses their razor with water to clean the hair and shave gels and cream and shave better etc. through the razor cartridge. When the water is being applied its usually in the shower or sink and the there's movement of the water and this allows the flexible blade on both sides to moving allowing a water flow through to be constantly moving all the way to the 2nd side not being used and exiting the razor cartridge. With single sided razors, the flex, floating and moving blade usually has plastic or cartridge materials or parts on the back side and does not have as much of a water flow through.

In one embodiment, the blade carrier or blade frame top flat surface can have holes and fit a control axis that goes through all the stacked Flex Blades—Floating Blades—Moving Blades. The control axis can be located anywhere and it can interact with each blade carrier or blade frame where the blade is permanently attached. The control axis point or points can interact with blade carrier opening and allow the Flex Blades Floating Blades—Moving Blades to flex and move. It can be designed to control the movement of the blade precisely because it's steel and not plastic. It would allow the blade to move within all tolerances for a close comfortable shave. Where the central axis interacts with the blade carrier opening the blade moves and as the blade moves the blade carrier moves using the axis as a guide. This axis point and axis guide can be located anywhere and even on each opposing end. The axis that goes through each blade carrier, blade frame or blade . . . can have smaller or narrower sections. This skinny or narrower section is where the top or flat area of the blade carrier goes through and these narrower sections are precise measurements so the blade can move upward or any direction with more precise tolerances. The axis is guide for how much the flexible blade or blade carrier can move. The axis and blade carrier interaction point or points can be located anywhere and can work any way to achieve the same effect.

In one embodiment, the blade carrier or blade frame can be welded or attached together. In one embodiment, the blade carrier or blade frame opposing ends can ride or rest on the ends of the cartridge. The ends of the cartridge can have pockets or cavities that the ends rest on and they can be tabs. When the user shave then the blades move on the tabs or these pocket or cavities hold the blade carrier ends.

In one embodiment, the blade carrier or blade frame ends or opposing ends can be stacked above each other and these ends can have spring or flexing technology or materials or features that allow the blade and the blade carrier to flex and or move.

In one embodiment the blade carrier or blade frame ends that blade are welded or permanently attached to one another are placed in a razor cartridge. One way it is disclosed in previous application is the blade carrier sits in the razor cartridge halves; these cartridge halves (2 pieces) have grooves or teeth that the blade carrier opposing ends are placed in half of each cartridge. The teeth or grooves or pockets are typically flat to hold the blade carrier end and blade carrier and blade in a fixed position so it does not move. A new way for this design to have flexible and floating and moving blades is to change the design of the teeth and grooves and pocket. Instead of teeth, pocket or grooves that hold the opposing blade carrier ends being flat, the middle section can be narrower and the outer ends of the pocket, grooves or teeth can be wider. This can be any shape or be in any location but for example like a peanut shape. The blade carrier ends rest on the middle section of the groove or teeth or pocket in a fixed position (blade resting position) and when the user shaves over different contours and shaving surfaces the blade carrier ends move or tilt upward or downward depending on the surface being shaved. These outer ends of the teeth, pocket or grooves can have precise limits and measurements of rotation so it can only move a certain amount so it can be kept in precise tolerances. The blade carrier ends moving in a grove or teeth pocket area is more precise and accurate than typical flexible razors that depend on plastic tabs that the plastic rest on and move up and own. The plastic tabs can be off to due to mold injection in consistencies. The blade carrier ends rely on steel to move in a plastic pocket, teeth or groove area and the movement will be more precise.

In another embodiment the pocket teeth or grooves can be flat shape but have more space above and below the blade carrier, blade frame to allow the blade to move. The blade carrier ends rest on the middle section of the groove or teeth or pocket in a fixed position (blade resting position) and when the user shaves over different contours and shaving surfaces the blade carrier ends move upward or downward depending on the surface being shaved. These outer ends of the teeth, pocket or grooves can have precise limits and measurements so the blade and blade carrier can only move up and down a certain amount for a comfortable shave using flexible technology.

The foregoing description of the embodiments has been provided for purposes of illustration and not intended to limit the scope of the present disclosure. Individual components of a particular embodiment are generally not limited to that particular embodiment, but, are interchangeable. Such variations are not to be regarded as a departure from the present disclosure, and all such modifications are considered to be within the scope of the present disclosure.

Technical Advancements

The present disclosure described herein above has several technical advantages including, but not limited to, the realization of a dual sided razor that:

can be switched between its blade sides without dismantling of the cartridge;

is user friendly as flexible blades make it easy for the razor to shave irregular surfaces;

is cost affordable; and offers longer life.

The foregoing disclosure has been described with reference to the accompanying embodiments which do not limit the scope and ambit of the disclosure. The description provided is purely by way of example and illustration.

The embodiments herein and the various features and advantageous details thereof are explained with reference to the non-limiting embodiments in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The foregoing description of the specific embodiments so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

Any discussion of materials, devices, articles or the like that has been included in this specification is solely for the purpose of providing a context for the disclosure. It is not to be taken as an admission that any or all of these matters form a part of the prior art base or were common general knowledge in the field relevant to the disclosure as it existed anywhere before the priority date of this application.

The numerical values mentioned for the various physical parameters, dimensions or quantities are only approximations and it is envisaged that the values higher/lower than the numerical values assigned to the parameters, dimensions or quantities fall within the scope of the disclosure, unless there is a statement in the specification specific to the contrary.

While considerable emphasis has been placed herein on the components and component parts of the preferred embodiments, it will be appreciated that many embodiments can be made and that many changes can be made in the preferred embodiments without departing from the principles of the disclosure. These and other changes in the preferred embodiment as well as other embodiments of the disclosure will be apparent to those skilled in the art from the disclosure herein, whereby it is to be distinctly understood that the foregoing descriptive matter is to be interpreted merely as illustrative of the disclosure and not as a limitation.

LIST OF REFERENCE NUMERALS

10—handle

10*a*—first side

10*b* second side
12—retention bump
20—arm
20*a*—first arm
20*b*—second arm
21*a*—first pivot
21*b*—second pivot
22—arm prong
24—cushion
24*a*,24*b*,24*c*,24*d*,24*e*,24*f*—cushion
26—recess
30—barrier
40—cartridge
41*a*, 41*b*, 41*c*, 41*d*—blade
42—track
43—blade tabs
44—blade pivot axis
45—blade carrier
46—blade pockets
47—blade finger
49—cartridge ribs
50—end cap
52*a*—first groove
52*b*—second groove
60—deflector
62—cavity
70—leaf spring
80—metal channel
90—lubricating strips
91—staggered and telescoping center blade support
X—vertical handle axis
Y—pivot axis
100—dual sided razor

What is claimed is:

1. A dual sided razor cartridge comprising:

a first shaving face and a second shaving face opposite the first shaving face;

a first blade receiving compartment accessed through the first shaving face and open to the first shaving face and a second blade receiving compartment accessed through the second shaving face and open to the second shaving face;

a plurality of razor blades at each of the first and second shaving faces received within the corresponding blade receiving compartment;

a plurality of blade retainers corresponding to the plurality of razor blades fixed within each blade receiving compartment, the blade retainers located adjacent opposite ends of the corresponding blade receiving compartment;

a plurality of fingers extending from the blade retainers towards a center of the corresponding blade receiving compartment; and at least one end cap, wherein the at least one end cap encloses a first end of the dual sided razor cartridge and extends at least partially onto both the first shaving face and the second shaving face, wherein each blade of the plurality of razor blades is retained in the corresponding blade receiving compartment at a first end by a first blade retainer and at a second end by a second blade retainer of the plurality of blade retainers, and wherein each blade of the plurality of razor blades is biased towards the corresponding shaving face by corresponding fingers of the plurality of fingers, wherein the at least one end cap is two end caps and extend to cover at least a portion of both the first blade receiving compartment and the second blade receiving compartment at each of a first end and a second end of the corresponding blade receiving compartments respectively, wherein a first end cap of the two end caps covers the first end of each of the plurality of razor blades and retains the corresponding first end in the corresponding blade retainer, and wherein a second end cap of the two end caps covers the second end of each of the plurality of razor blades and retains the corresponding second end in the corresponding blade retainer.

2. The dual sided razor cartridge of claim 1, wherein each razor blade is incorporated into a discrete razor blade assembly having a blade carrier, and wherein the carrier is retained by the corresponding blade retainers, and wherein the corresponding razor blade is located at the corresponding shaving face by the blade carrier.

3. The dual sided razor cartridge of claim 2, wherein each blade carrier is bent, such that a retaining portion has a first orientation and is retained by the blade retainers, and a blade mounting portion has a second orientation angled relative to the retaining portion and locates the corresponding razor blade.

4. The dual sided razor cartridge of claim 3, wherein the fingers bias the corresponding razor blade by applying a biasing force to the blade mounting portion.

5. The dual sided razor cartridge of claim 2, wherein the fingers bias the corresponding razor blade by applying a biasing force directly to the razor blade.

6. The dual sided razor cartridge of claim 1 further comprising at least one cartridge rib within the blade receiving compartment between the plurality of blade retainers, wherein the at least one cartridge rib locates each razor blade within at least one of the first and second blade receiving compartments.

7. The dual sided razor cartridge of claim 6, wherein the at least one cartridge rib is centered between the plurality of blade retainers, and wherein the cartridge rib further retains each razor blade within the corresponding blade receiving compartment.

8. A dual sided razor cartridge comprising:

a first shaving face and a second shaving face opposite the first shaving face:

a first blade receiving compartment accessed through the first shaving face and open to the first shaving face and a second blade receiving compartment accessed through the second shaving face and open to the second shaving face:

a plurality of razor blades at each of the first and second shaving faces received within the corresponding blade receiving compartment;

a plurality of blade retainers corresponding to the plurality of razor blades fixed within each blade receiving compartment, the blade retainers located adjacent opposite ends of the corresponding blade receiving compartment;

a plurality of fingers extending from the blade retainers towards a center of the corresponding blade receiving compartment; and at least one cartridge rib within at least one of the first and second blade receiving compartments between the corresponding plurality of blade retainers, wherein the at least one cartridge rib locates each razor blade within the blade receiving compartment wherein each blade of the plurality of razor blades is retained in the corresponding blade receiving compartment at a first end by a first blade retainer and at a second end by a second blade retainer of the plurality of blade retainers, and wherein each blade of the plurality of razor blades is biased towards the corresponding shaving face by corresponding fingers of the plurality of fingers wherein the at least one cartridge rib is centered between the plurality of blade retainers, and wherein the cartridge rib further retains each razor blade within the corresponding blade receiving compartment, wherein the blade retainers each comprise a notch for retaining a corresponding razor blade or razor blade assembly, and wherein the at least one cartridge rib comprises notches for each razor blade of the corresponding plurality of razor blades, each notch of the cartridge rib being aligned with a corresponding notch of the corresponding blade retainer.

9. The dual sided razor cartridge of claim 8, wherein the at least one cartridge rib is a plurality of cartridge rib located at intervals between the plurality of blade retainers.

* * * * *